(12) United States Patent
Zografos

(10) Patent No.: US 9,990,845 B2
(45) Date of Patent: Jun. 5, 2018

(54) COMMUNICATIONS PLATFORM FOR FACILITATING EFFICIENT CONTAINER TRANSPORT

(71) Applicant: Leidos, Inc., Reston, VA (US)

(72) Inventor: Anastasios Zografos, San Mateo, CA (US)

(73) Assignee: Leidos, Inc., Reston, VA (US)

( * ) Notice: Subject to any disclaimer, the term of this patent is extended or adjusted under 35 U.S.C. 154(b) by 0 days. days.

(21) Appl. No.: 15/356,855

(22) Filed: Nov. 21, 2016

(65) Prior Publication Data

US 2017/0148313 A1    May 25, 2017

Related U.S. Application Data

(60) Provisional application No. 62/257,794, filed on Nov. 20, 2015.

(51) Int. Cl.
*G08G 1/00* (2006.01)
*G08G 1/01* (2006.01)

(52) U.S. Cl.
CPC ......... *G08G 1/0141* (2013.01); *G08G 1/0112* (2013.01); *H04W 4/70* (2018.02); *H04W 4/80* (2018.02)

(58) Field of Classification Search
None
See application file for complete search history.

(56) References Cited

U.S. PATENT DOCUMENTS

| | | | | |
|---|---|---|---|---|
| 6,424,260 B2 * | 7/2002 | Maloney | ............... | G06K 17/00 235/383 |
| 6,577,921 B1 * | 6/2003 | Carson | ................... | G06Q 10/08 340/850 |
| 6,665,585 B2 * | 12/2003 | Kawase | .............. | G06K 7/0008 414/137.1 |
| 6,847,892 B2 * | 1/2005 | Zhou | ..................... | G01S 5/0027 340/426.1 |
| 7,196,622 B2 * | 3/2007 | Lambright | ............ | G06Q 10/08 235/384 |
| 8,280,345 B2 * | 10/2012 | Twitchell, Jr. | ......... | G06Q 10/08 455/404.2 |
| 8,284,045 B2 * | 10/2012 | Twitchell, Jr. | ......... | G06Q 10/08 340/539.1 |

(Continued)

*Primary Examiner* — Jonathan M Dager
(74) *Attorney, Agent, or Firm* — Dawn-Marie Bey; Bey & Cotropia PLLC

(57) ABSTRACT

A process, including a mobile application, for tracking the drayage driver and vehicle movement and reporting where the driver is and how much time he has been at a location, as well as details about the driver and cargo is described. This process can correlate driver and vehicle identification and allow for the transfer of bill of lading or hazardous material restrictions. Data captured is easily be made available in advance to the port terminals (which must have container ready for pick up); available for the shipping company (which can see cargo en-route—regardless of which company the driver works for); and available for the destination warehouse (which must receive and process the shipment). The association of cargo owners, shippers, terminal yards, drayage companies, drivers, and drayage job assignments can further be linked.

15 Claims, 27 Drawing Sheets

(56) References Cited

U.S. PATENT DOCUMENTS

| | | | | |
|---|---|---|---|---|
| 8,334,773 B2* | 12/2012 | Cova | | G06Q 10/0833 340/572.1 |
| 8,390,442 B2* | 3/2013 | Burns | | G01S 5/14 235/385 |
| 8,432,274 B2* | 4/2013 | Cova | | G01S 5/0027 340/539.1 |
| 8,441,336 B2* | 5/2013 | Rickrode | | E05B 39/00 340/5.7 |
| 8,471,706 B2* | 6/2013 | Schuster | | G08B 13/2402 340/572.1 |
| 9,049,641 B2* | 6/2015 | Wible | | H04W 48/04 |
| 9,087,315 B1* | 7/2015 | Meyers | | G06Q 10/087 |
| 9,147,175 B2* | 9/2015 | Schmidt | | G06Q 10/087 |
| 9,177,282 B2* | 11/2015 | Stevens | | G06Q 10/0833 |
| 9,426,627 B1 | 8/2016 | Logan et al. | | 455/414.3 |
| 9,472,125 B2* | 10/2016 | Debrody | | G09F 3/0317 |
| 9,721,224 B2* | 8/2017 | Waris | | G06Q 10/083 |
| 2002/0089434 A1* | 7/2002 | Ghazarian | | G06Q 10/08 340/988 |
| 2003/0191555 A1* | 10/2003 | Takehara | | G06Q 10/08 700/215 |
| 2004/0174259 A1* | 9/2004 | Peel | | G07C 5/008 340/539.26 |
| 2004/0233041 A1* | 11/2004 | Bohman | | G06K 7/0008 340/10.1 |
| 2004/0249557 A1* | 12/2004 | Harrington | | G01M 17/007 701/115 |
| 2005/0149373 A1* | 7/2005 | Amling | | G06Q 10/08 705/28 |
| 2005/0278063 A1* | 12/2005 | Hersh | | G06Q 10/06311 700/216 |
| 2006/0109106 A1* | 5/2006 | Braun | | G06Q 10/08 340/539.13 |
| 2006/0158326 A1* | 7/2006 | Easley | | G06Q 10/08 340/522 |
| 2006/0220851 A1* | 10/2006 | Wisherd | | G01S 5/06 340/568.1 |
| 2007/0115859 A1* | 5/2007 | Meyers | | G06Q 10/08 370/254 |
| 2007/0119927 A1* | 5/2007 | Wingo | | B65D 90/00 235/385 |
| 2007/0139197 A1* | 6/2007 | Hopman | | G06Q 10/08 340/572.1 |
| 2007/0200765 A1* | 8/2007 | Meyers | | H01Q 1/2208 343/700 MS |
| 2008/0111693 A1* | 5/2008 | Johnson | | G01S 13/74 340/572.1 |
| 2008/0191937 A1* | 8/2008 | Wisherd | | G01S 19/07 342/357.44 |
| 2008/0243301 A1* | 10/2008 | Lanigan | | G06Q 10/08 700/214 |
| 2008/0266131 A1* | 10/2008 | Richardson | | G01S 19/07 340/4.62 |
| 2009/0089145 A1* | 4/2009 | Kent | | G06Q 10/0631 705/7.12 |
| 2009/0171500 A1* | 7/2009 | Matsumoto | | G06Q 10/08 700/217 |
| 2009/0290512 A1* | 11/2009 | Twitchell, Jr. | | B65D 88/121 370/254 |
| 2009/0322510 A1* | 12/2009 | Berger | | G06Q 10/08 340/539.1 |
| 2012/0158609 A1* | 6/2012 | Dickman | | G06Q 10/08345 705/335 |
| 2013/0071210 A1* | 3/2013 | Lanigan, Sr. | | B66C 17/06 414/281 |
| 2015/0248639 A1* | 9/2015 | Maney | | G06Q 10/08345 705/335 |

* cited by examiner

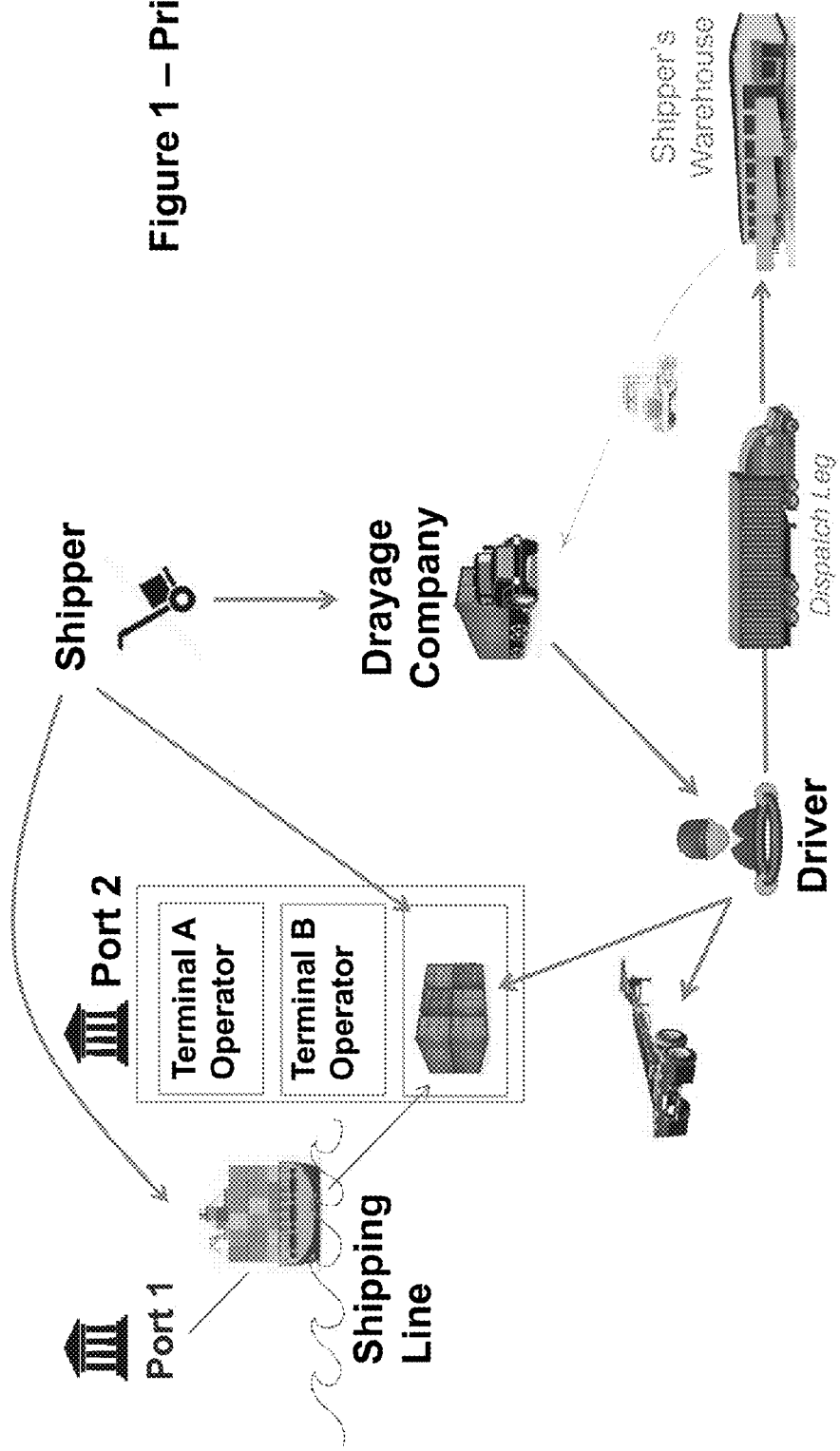
Figure 1 – Prior Art

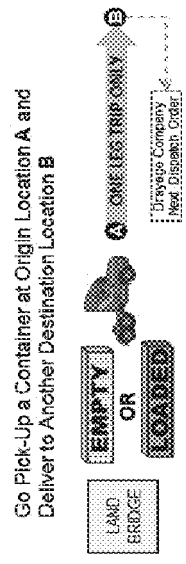
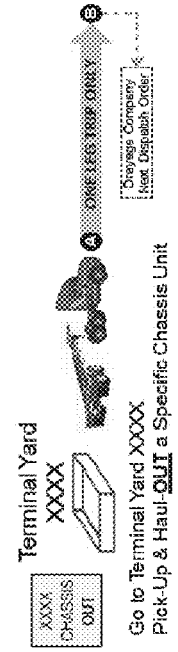
Figure 2c – Prior Art
Figure 2d – Prior Art
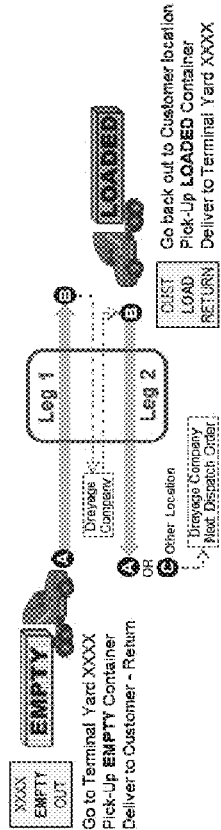
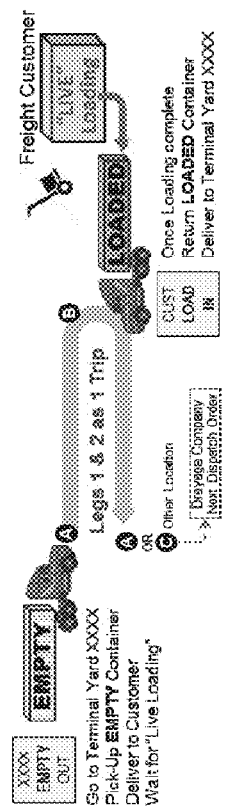
Figure 2a – Prior Art
Figure 2b – Prior Art

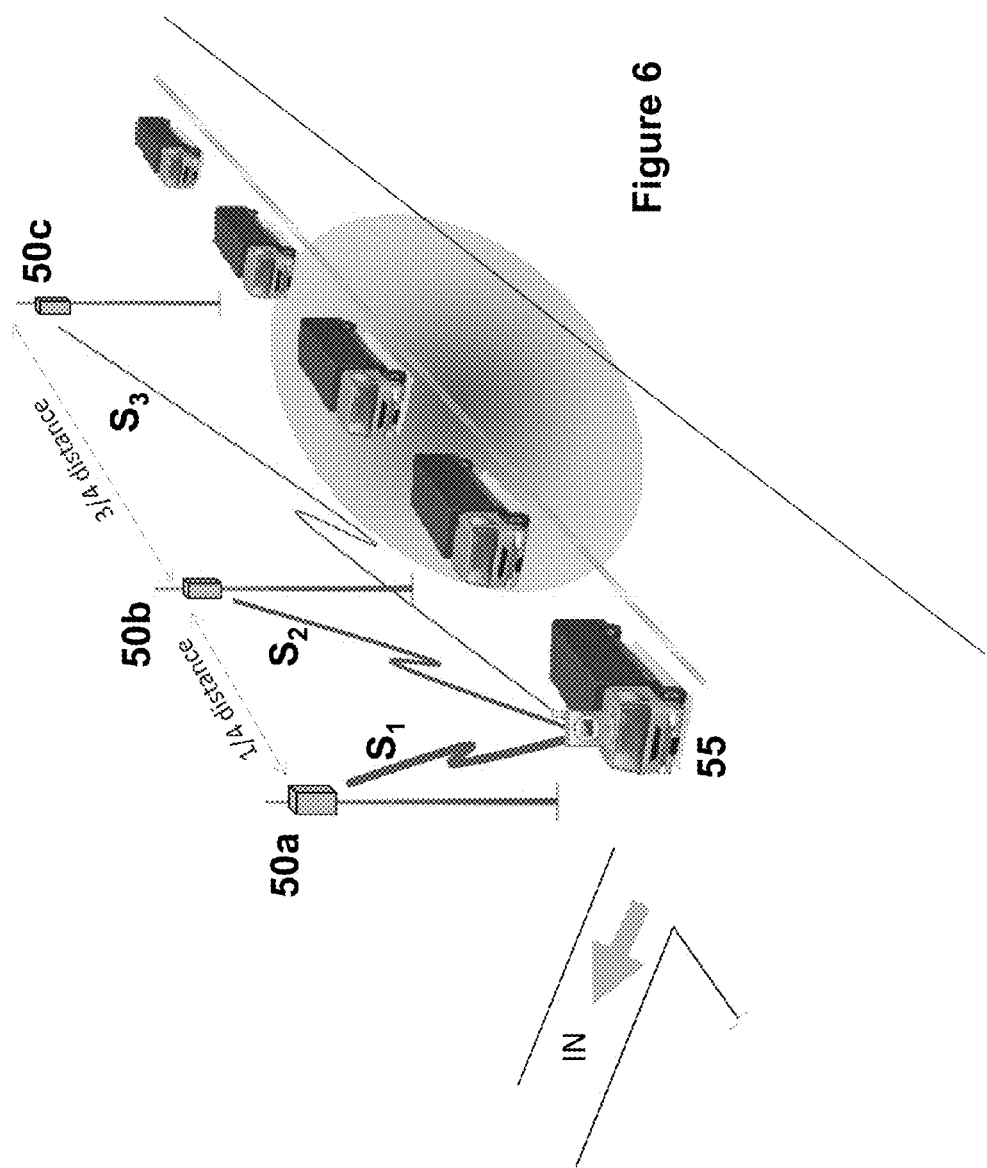

Figure 10c

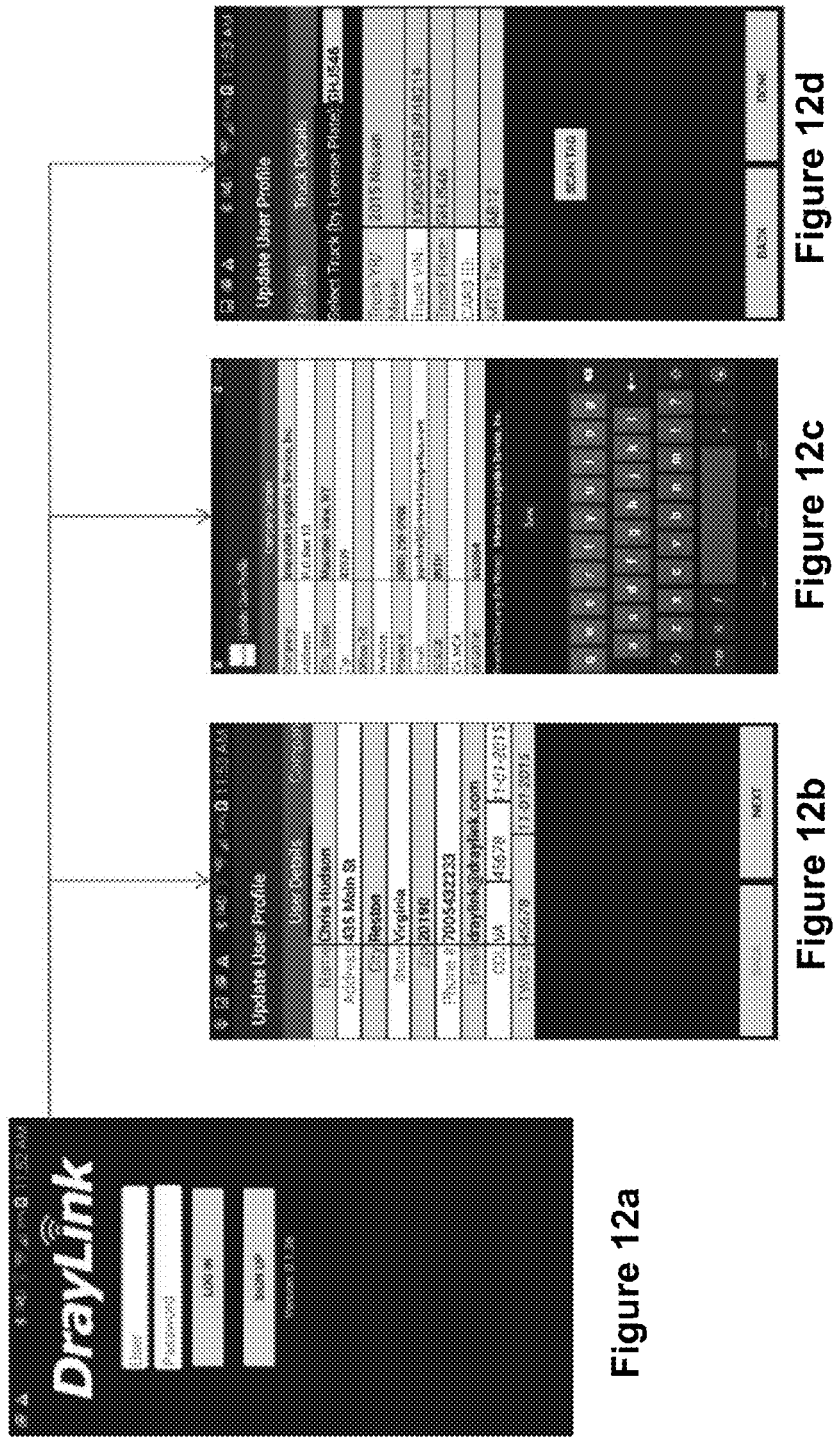

COMMUNICATIONS PLATFORM FOR FACILITATING EFFICIENT CONTAINER TRANSPORT

BACKGROUND

The age of the driverless vehicle is nearly upon us, being accelerated by the expansion of mobile computing and telecommunications. Applicant is actively working in the field known as the Connected Vehicle (CV) initiative. Current efforts are underway to develop Vehicle-to-Vehicle (V2V) and Vehicle-to-Infrastructure (V2I) applications and technologies that provide the ability for cars to "talk" to each other and "talk" to the road infrastructure. USDOT, auto manufacturers, and private sector firms like Google, Qualcomm, and others are making significant investment in such products and services that offer improved vehicle safety, security, mobility, and environmental benefits.

A key challenge to realizing the CV market is that the entire auto industry must adopt and install uniform standard technology in each new vehicle and also provide aftermarket devices for existing consumer vehicles. CV mobile applications that support Mobile-to-Mobile (M2M), Mobile-to-Vehicle (M2V), and Mobile-to-Infrastructure (M2I) data exchange will need to be developed. These new CV mobile applications can be disruptive, enabling, and game changers.

Instead of waiting for all car manufacturers to equip all new vehicles with standard CV technology, a consumer would instead be able to use their mobile smartphone in a vehicle to, for example, send a safety warning message to another vehicle or to a pedestrian that it is in the vehicle's blind spot. This addresses a safety benefit of CV mobile apps, but another large untapped market opportunity is in mobility and security of freight. The CV may also improve mobility and security for transporting shipping containers on land.

The U.S. is served by 360 commercial marine ports. Roughly 16 Million shipping containers enter U.S. ports each year. These containers, when they arrive at a port, must be moved landside. Drayage trucks for hire haul these containers from the port to a warehouse or a yard, and then from the yard to its interim or final destination. Each of these drayage movements involve different contracts and different companies, with none of these necessarily being linked to one another. Additionally, shipping containers must be transported on a unique trailer "chassis" and a unique driver-truck combination. Trucks must be properly credentialed and drayage drivers are required to carry a DHS-TSA Transportation Worker ID Card (TWIC). There are a multitude of transactional assignments and verifications surrounding a single container transport move thus resulting in an inefficient and costly operation. There is currently no all-encompassing capability or data source existing for track and trace in-transit visibility of shipping containers and assets performing services at ports, borders, intermodal yards. Further given that there are multiple diverse and competing business interests amongst current drayage stakeholders such a system and process would be difficult to implement. Further still, in view of stringent security and other requirements surrounding ports, deemed "critical infrastructure", and port operations, adoption of technology in the drayage market has been slow. Drayage companies currently dispatch is via paper, telephone or text instruction and there is no centralized data source for stakeholders to leverage to make better operational business decisions.

Taking a step back, FIG. 1 schematically illustrates the various entities and relationships impacting the drayage process. Although drayage generally refers to the transport of goods over a short distance, usually as part of a longer haul, shipping and port/terminal operations and processes directly impact drayage. Accordingly, we see in FIG. 1 that multiple Ports, Shippers/Shipping Lines, Terminal Operators and, of course, Drayage Companies and their Drivers are key players in the process. Additionally, various Government Agencies including the Port Authorities, Customs and Border Protection (CBP), Transportation Security Administration (TSA), and other Federal, State, and Local agencies have a stake in the cargo moving process and depend on timely and quality information for enabling safe, secure, and efficient movement of imported into and exported freight. A brief summary of each entity-type and their corresponding parts in the process are further described below.

Drayage Drivers are a vital element in the drayage process. They are required to possess a commercial driver's license, pass a physical exam every 2 years, and comply with all federal, state, local regulations. In addition, specific to U.S. ports which are deemed "critical infrastructure", drivers must qualify and possess a Transportation Worker Identification Card (TWIC) to enter a terminal operator's yard. Operationally, drivers depend on drayage company dispatch orders to pick-up or drop-off shipping containers and a trip-leg can be as short as 1 mile to 100 miles. Drivers can be company employees or contracted independent operators and earn compensation based on the number of completed dispatch order in a given work day.

Drayage Companies are hired to transport the shipping container from a local warehouse and deliver it to the origin port terminal operator yard. Likewise, the Drayage Company retrieves the container then from the destination port, in and out of the port terminal operator yard. Drayage companies rely on a combination of employee drivers and company fleet trucks as well as independent owner-operators who may individually own their own trucks and hired to transport containers.

Freight Customer is the owner of the cargo packed into a leased shipping container and sometimes referred to as the Beneficial Cargo Owner (BCO). The freight customer may also contract out the responsibility for the transport to a freight forward agent importer/exporter and/or a Third Party Logistics (3PL) agent who administers oversees and manages the entire movement of the containerized freight by contracting for each leg move of the end-to-end transport service.

Terminal Operators exist at both the origin location port and at the destination port. They are contracted at the origin location port to receive the shipping container (hauled in by a drayage truck/driver) into their yard and stack/hold until time to load onto a ship for transport. At the destination port, a terminal operator unloads the container from the ship and stacks/stores until such time a drayage truck/driver arrive to haul away to the freight customer warehouse location, usually within 100 miles from the port.

Shipping Lines are contracted to haul containers overseas from origin port-to-destination port. Shipping Lines either own or lease shipping containers used to transport freight. While certain companies have their own fleet of containers and use them solely for their own shipping requirements globally, no single shipping line in the world can operate with just their fleet of containers and usually lease containers from lease companies from time to time depending on the demand.

Referring to FIGS. 2a-2d, examples of various basic drayage dispatch moves are shown. Drayage dispatch moves represent the dispatch orders to drivers regarding short distance container movements. FIG. 2a illustrates an exemplary 2 leg trip; often completed over two days which represents two transactions. FIG. 2b illustrates a live load where both legs are completed in a single day transaction. FIG. 2c illustrates a one way, single move transaction (container) and FIG. 2d illustrates a similar one way, single move transaction (chassis).

The ability to efficiently and effectively move and track cargo is not only critical to the financial success of all of the participating entities shown in FIG. 1, but is equally critical for supply chain security as well as for curbing environmental impacts. It is estimated that over 100M shipping containers are moved landside each year globally with about 16M/year at US ports alone. The embodiments help address safety and security issues related to moving containers. US cargo theft is estimated at $30B annually and over 80% as whole container/truckload with "deceptive pick up" is the fastest growing method. This is of key interest to port authorities, federal agencies such as DHS, CBP, TSA and USDOT, state agencies such as highway safety-patrol and transportation officials. Also local authorities are now focused on port sustainable communities where diesel trucks operate nearby negatively affect the health and well-being of families/households living nearby—leading to environmental restrictions and the need to effectively monitor regulatory compliance while optimizing goods movement.

Accordingly, there is a perpetual need in the drayage industry for ways to better manage the drayage process. In addition to the obvious benefit to drayage operators, other entities who are interested in safe and secure container movements, such as terminal operators, port authorities, federal agencies (DHS, USDOT, etc.), cargo owners, container owners, chassis owners, freight forwarders, and final destination recipients would also benefit from improvements.

SUMMARY OF THE EMBODIMENTS

In a first exemplary embodiment, a system for determining a wait time along a predetermined vehicle route includes: multiple sensors for receiving individual wireless signals from one or more emitting devices located in a vehicle within a predetermined threshold range of each of the multiple sensors, wherein each of the multiple sensors is located along the predetermined vehicle route; a wireless data aggregator module running on at least one processor for collecting the individual wireless signals from the multiple sensors, wherein for each individual wireless signal the wireless data aggregator module identifies at least an individual transmission device emitting the individual wireless signal and the multiple sensor that received the individual wireless signal; and a wait time determination module running on at least one processor for analyzing data from the wireless data aggregator module to calculate a length of time that each of the individual wireless signals takes to move along the predetermined vehicle route and generating an output indicative of the length of time for at least one of the individual wireless signals.

In a second exemplary embodiment, a process for determining a wait time along a predetermined vehicle route includes: receiving individual wireless signals from one or more emitting devices in a vehicle at multiple sensors located within a predetermined threshold range of each of the multiple sensors, wherein each of the multiple sensors is located along the predetermined vehicle route; collecting the individual wireless signals from the multiple sensors at a wireless data aggregator module running on at least one processor, wherein for each individual wireless signal the wireless data aggregator module identifies at least an individual transmission device emitting the individual wireless signal and the multiple sensor that received the individual wireless signal; and analyzing data from the wireless data aggregator module by a wait time determination module running on at least one processor to calculate a length of time that each of the individual wireless signals takes to move along the predetermined vehicle route and generating an output indicative of the length of time for at least one of the individual wireless signals.

BRIEF DESCRIPTION OF FIGURES

The following figures illustrates various features of the present embodiments and are intended to be considered with the textual detailed description provided herein.

FIG. 1 illustrates certain known entities participating in cargo shipping and drayage operations;

FIGS. 2a-2d illustrate certain prior art drayage runs typically ordered by drayage companies;

FIG. 6 illustrates an exemplary portion of a route with wireless sensors along which trucks travel during drayage routes in accordance with one or more embodiments;

FIGS. 10a-10c illustrate exemplary web portal screen shots for registering a driver with the transport communications platform ("TCP") described herein;

FIGS. 12a-12d illustrate exemplary mobile application screen shots for registering a driver with the transport communications platform ("TCP") described herein;

FIGS. 13a-13c illustrate exemplary mobile application screen shots facilitating specific trip event tracking and record, including calculation of estimated running and estimated remaining times for the street and terminal queues in accordance with one or more embodiments;

DETAILED DESCRIPTION

Figure 3:
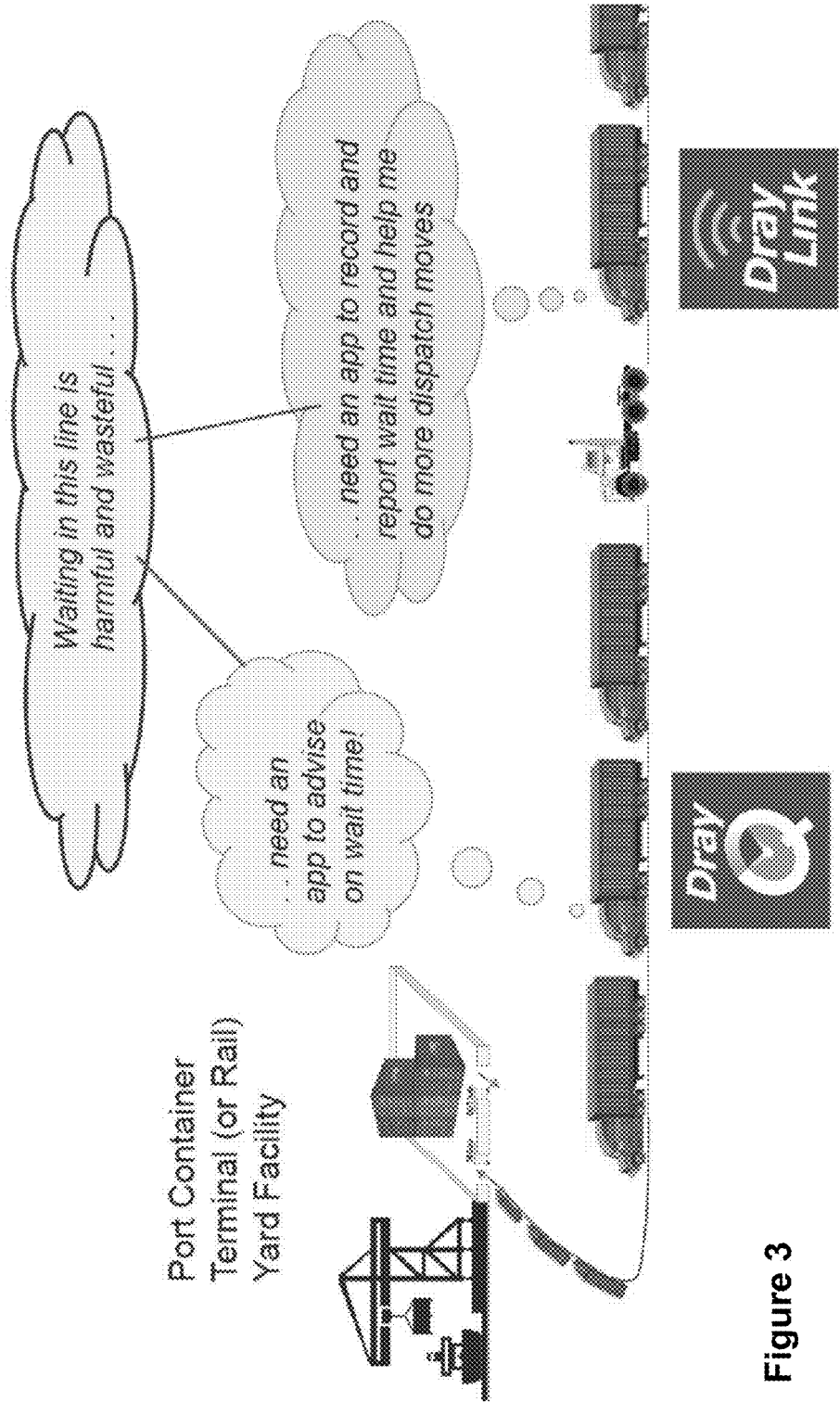
FIG. 3 illustrates a schematic of the problems encountered by drayage companies due to wait times.

The present embodiments are directed to a system and process, including a mobile application, for tracking the drayage driver and vehicle movement and reporting where the driver is and how much time he has been at a location, as well as details about the driver and cargo. This application can correlate driver and vehicle identification and allow for the transfer of bill of lading or hazardous material restrictions. Data captured is easily be made available in advance to the port terminals (which must have container ready for pick up); available for the shipping company (which can see cargo en-route—regardless of which company the driver works for); and available for the destination warehouse (which must receive and process the shipment). The association of cargo owners, shippers, terminal yards, drayage companies, drivers, and drayage job assignments can further be linked.

The embodiments provide an innovative, disruptive, offering as a re-occurring managed service for optimizing the coordination and visibility of moving shipping containers landside.

Extended embodiments may incorporate additional features such as leveraging Google mapping and route directions and integration with traffic and routing-related applications such as WAZE, emergency alert messaging, chassis gray pool search, registration, and location mapping; over-size-overweight permitting; and hazmat transport reporting.

Specialized embodiments include a secure data exchange extension for "government use only" that leverages the M2I application for secure port-intermodal facility or border crossing notification reporting (to be correlated with the commercial data stored.

Generally, the embodiments described herein include a transport communications platform ("TCP" or DrayLink) which may be offered as a Software-as-a-Service (SaaS) mobile and web-based application that connects drivers, companies, shippers, terminal operators, and government authorities to improve the ground transport of containerized freight at maritime ports, intermodal facilities, military installations, and international border crossings.

The TCP provides users with a common single platform to communicate, dispatch, track, and trace the drayage movement of cargo shipping containers from point-to-point origin to destination, providing in-transit visibility throughout the ground transport supply chain process. The TCP offers Drivers a single tool for communicating with dispatchers (employers) and shippers. Real-time messaging allows you to send and receive notifications, alerts, and dispatch orders. DrayLink creates reports for each drayage move, which include, street wait times, terminal turn times (calculated from entry to exit), and the combined wait time. It can also securely store Driver credentials, certifications and vehicle information, allowing Drivers to share and verify compliance with your employers (Companies). For independent drivers, ability to link with companies seeking dispatch fulfillment.

Companies (dispatchers) a single platform for managing drayage movements. It allows you to select from the available pool of qualified drivers, confirm driver compliance and quickly send pick-up and delivery information. Throughout the move you receive real-time updates, notifications and alerts that help you validate driver wait times, optimize schedules and improve customer expectations. Dispatch details can be sent to a driver's smartphone. The TCP offers a mechanism to streamline regulatory compliance of truck assets.

Shippers automatic track, trace, and reporting notifications (e.g., e-mail, text, messaging) that improves overall visibility. Then use this information to update back-end dispatch systems with more accurate estimates of delivery times.

Terminal Operators the ability to receive prior advance notification on truck dispatches scheduled for their facility concerning the specific container on premise Government authorities the ability to gain a better understanding on any bottleneck's affecting throughput and performance of port drayage operations Mobile queue (also called DrayQ) is a mobile application service that allows drivers to receive advance information regarding the current wait times to enter a specified container terminal yard. The information is presented in a manner that indicates the current expected wait time as well as the trending of that wait time (shorter or longer) so that a driver can make a more informed decision as to whether or not to enter the queue line or opt out and perform some other in-transit activity waiting for a more optimal time to enter the queue line. FIG. 3 provides a very high level schematic of the problem and solution dynamic addressed by the embodiments herein for DrayLink and DrayQ. Additional descriptions and examples of DrayLink and DrayQ system components, functionality and output are discussed below. DrayLink and DrayQ are designed specifically for, and in partnership with, the intermodal drayage industry on a port-by-port basis. They use a combination of Bluetooth®, Wi-Fi® and GPS technologies to collect data in and around ports and terminals. This data is collected anonymously, then processed and correlated to show only the most useful information to the drayage community.

Figure 4:
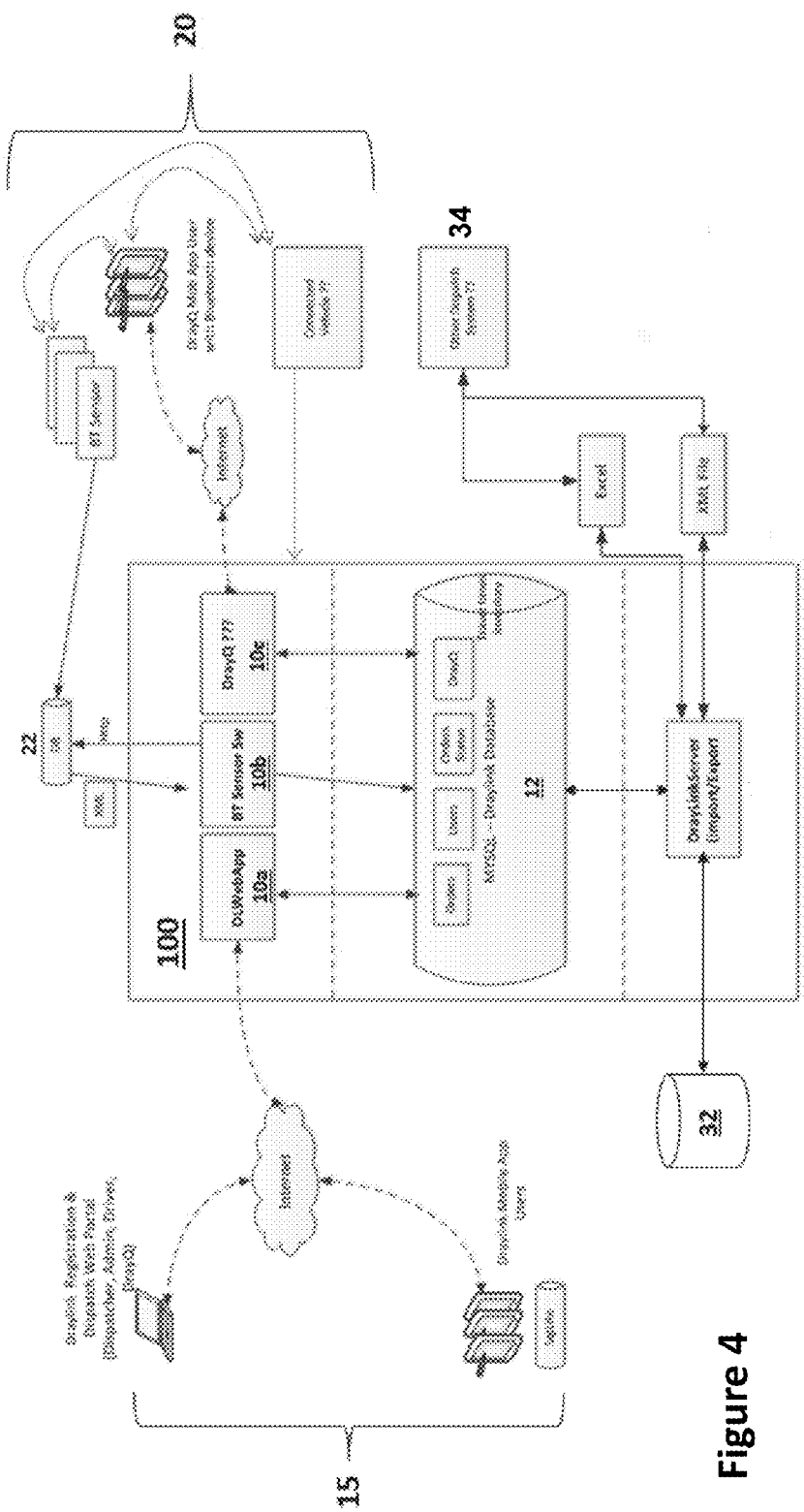
FIG. 4 provides an exemplary schematic of an overall system for implementing the processes described herein with respect to one or more embodiments.

FIG. 4 provides an exemplary schematic of an overall computing system 100 which includes at least processing 10a-10c and storage (database) 12 components which perform data analyses and storage functions. The components may be in the cloud and implemented using, for example, Amazon Web Service (AWS). As shown, individual applications and software may be implemented as separate components, e.g., DrayLink Web Application (DLWebApp) 10a, Bluetooth Sensor software (BT Sensor SW) 10b and DrayQ 10c. The DLWebApp 10a communicates over the Internet with users 15 through mobile devices via a mobile application and through web portals. The BT Sensor SW 10b retrieves stored timing signal data, e.g., Bluetooth or Wi-Fi or radio-wave emitting device data, which has been collected by appropriate sensors from signal-enabled devices 20. Such signal-enabled devices may include driver's mobile devices, as well as vehicles having signal-enabled technology. Though a single timing signal collection database 22 is shown, the embodiment is not so limited. The embodiment may connect with multiple databases, proprietary and public, in order to continually collected timing signal data. As discussed herein, in at least one implementation, the signal data is anonymous aggregated data. In other implementations, additional details from the signals is also collected in accordance with registration information provided by users. Accordingly, it is anticipated that certain databases would contain identifying information and thus not be public, while databases collecting signal data in an anonymous aggregation process may be public. All such timing signal data may be used.

Additionally, a designated server 25 may provide import and export functions to ascertain and provide relevant data. Database 32 represents one or more individual state and federal public or proprietary databases which may be accessed to retrieve data relevant to the TCP processes. For example, individual driver motor vehicle and other relevant personal records may be accessed to populate the TCP database 12.

Collected and analyzed data is stored in database 12 of the computing system 100 and accessed by various components, including at least DrayLink Web Application (DLWebApp) 10a and DrayQ 10c to provide requested information and/or notifications and alerts to users 15 and 20 in accordance with the embodiments described herein.

Further still, for registered drayage companies or other dispatchers, specific drayage order data may be collected through the TCP web portal (15) or via other dispatch systems 34. Drayage orders may be linked to registered drivers and order status may be tracked and updated as drivers move through specific queues along their drayage routes. This real time status information is critical to efficient cargo transport and allows drayage companies or dispatchers to revise routes and orders as needed depending on the availability (or lack thereof) of drivers who are stuck in queues or out of queues as the case may be.

Figures 5A, 5B:
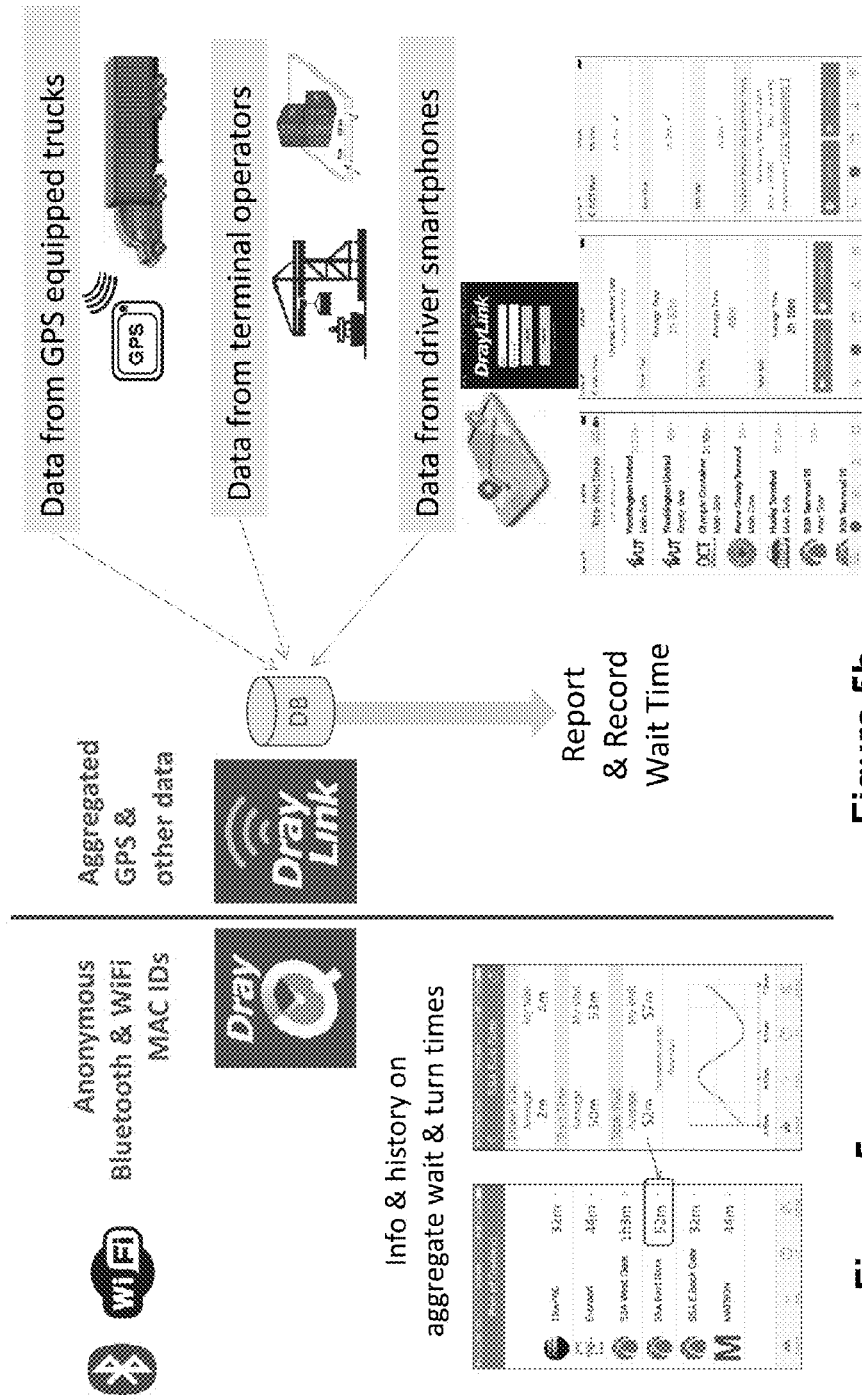
FIGS. 5a and 5b illustrate different types of data which may be used to determine wait times, aggregated and individual, and generate details regarding same in accordance with one or more embodiments.

FIGS. 5a and 5b provide a schematic which illustrates at a high level the different types of data which may be used to determine wait times, aggregated and individual, and generate details regarding same. As discussed herein, though not required to be wholly separate applications, the DrayQ application of FIG. 5a is less individualistic and more anonymous in nature. By collecting, e.g., sniffing, anonymous Bluetooth, WiFi or other wireless signals and tracking associated MAC IDs along predetermined travel routes, e.g., roads and access areas in and around terminals, and the like, in at least one embodiment, information and history on aggregate wait and turn times is available to users of the application. This collected data may also be used to provide individual wait time information, as well as to track driver movement and cargo delivery using a different version of the application wherein driver-specific, vehicle-specific, predetermined route information, cargo-specific information and the like are also provided to the application.

Referring to FIG. 5b, in addition to the "sniffed" data, GPS data collected from GPS enabled trucks and smart devices, e.g., mobile smart phones, may also be gathered and used to calculate aggregate, average, historical and actual wait times on a per route and even per driver basis. And the application can refresh the times in virtually real-time as it receives and accesses updated wireless and GPS signals.

In FIG. 6, a schematic illustrates a few of many wireless signal sensors 50a-50c . . . 50x which may be pre-existing or placed along the route wherein a queue usually forms. As illustrated, as vehicle 55 drives along the queue route, the signal(s) emitted from vehicle 55, signals being from driver devices or the vehicle itself, are sensed by the sensors 50a-50c with signal strength decreasing as the vehicle moves away from a sensor and eventually handing off as the next sensor comes within range, i.e., signal strength reached hand-off threshold for the approaching sensor. As shown, signal strength $S_1$ is strongest at sensor 50a with decreasing strength as distance increases. As data is collected and time stamped at the sensors, whose locations are fixed, computing system 100 (FIG. 4) is able to use the data, to determine direction the vehicle 55 is moving, approximate speed vehicle 55 is moving through the queue and estimate wait time for vehicle 55 to move all the way through the queue.

Figure 7:
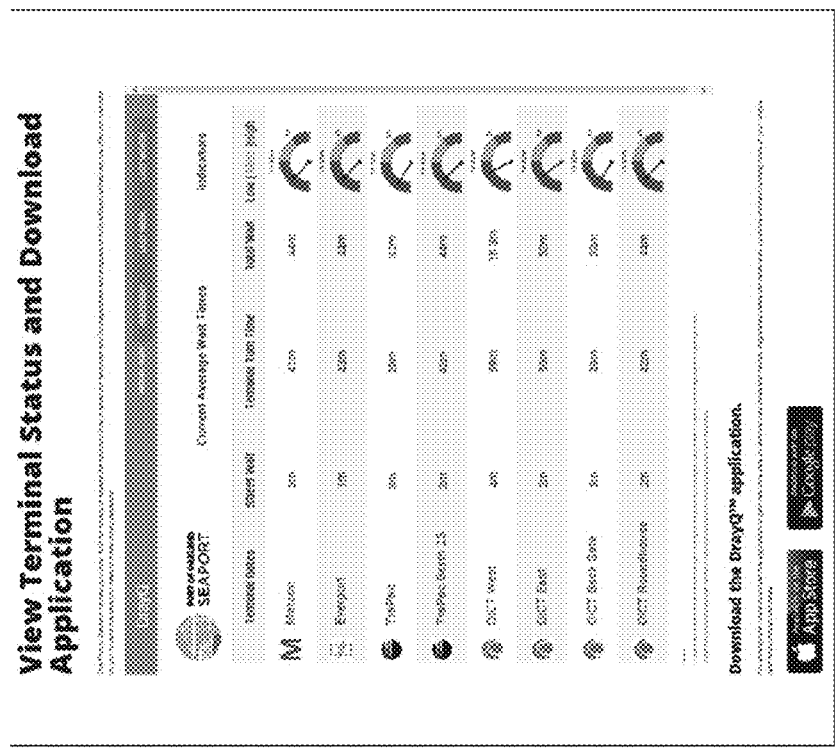
FIG. 7 illustrates a web application screen shot indicating terminal wait times in accordance with one or more embodiments.
Figures 8A, 8B:
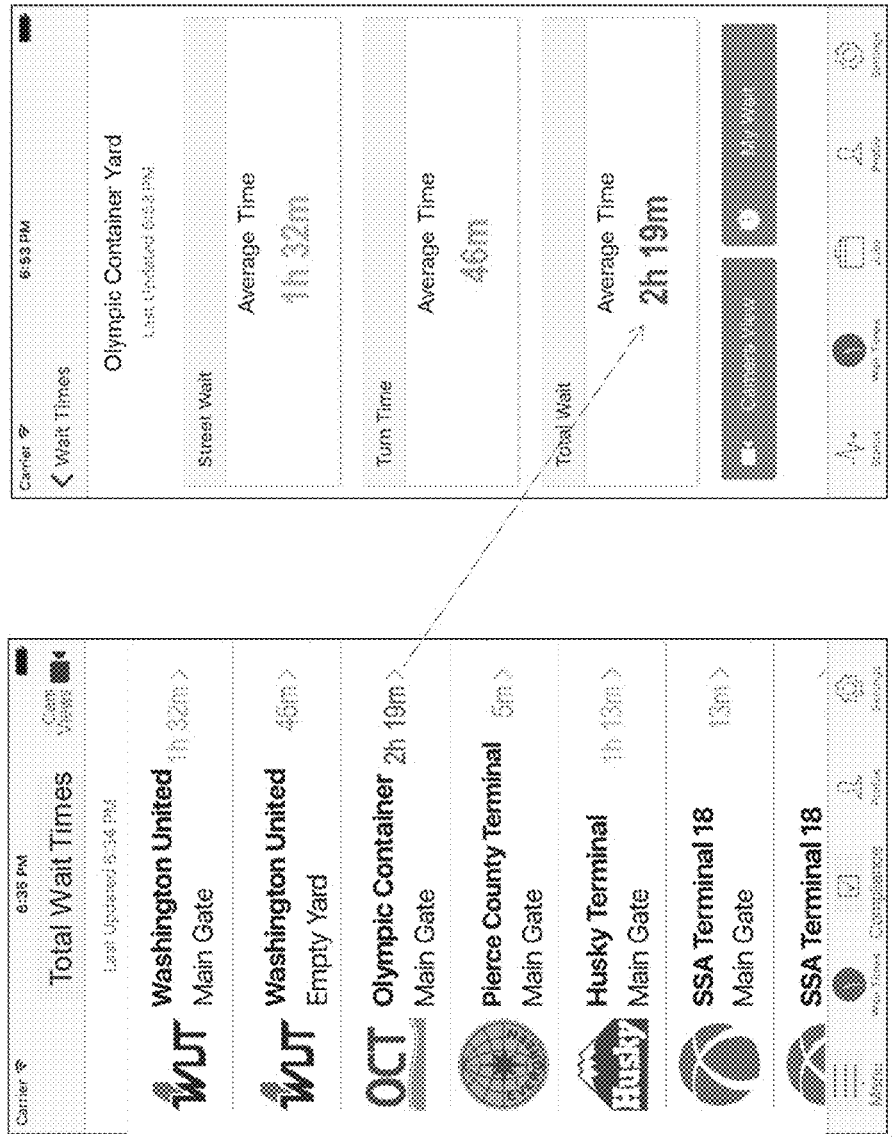
FIGS. 8a-8b illustrate mobile application screen shots indicating terminal wait times in accordance with one or more embodiments.

FIGS. 7, 8a and 8b provides exemplary screen shots from a web-based and mobile application version of the DrayQ application, wherein users can access information about total and average wait times, including break downs between street wait times and turn times, i.e., time spent actually within the terminal gates, for different terminals. The information shown is aggregated across many drivers and trucks and is not individualized.

Figure 9D:
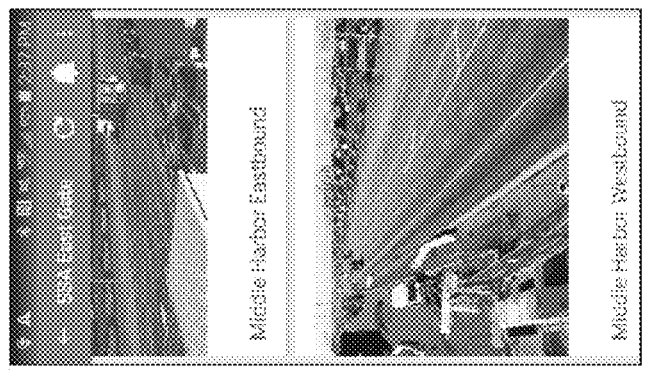
FIGS. 9a-9d illustrate exemplary mobile screen shots for providing estimated wait times related to port and terminal operations impacting registered drayage drivers in accordance with one or more embodiments.
Figure 9C:
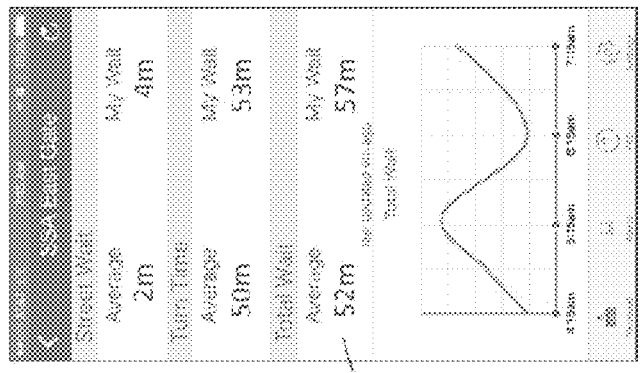
Figure 9B:
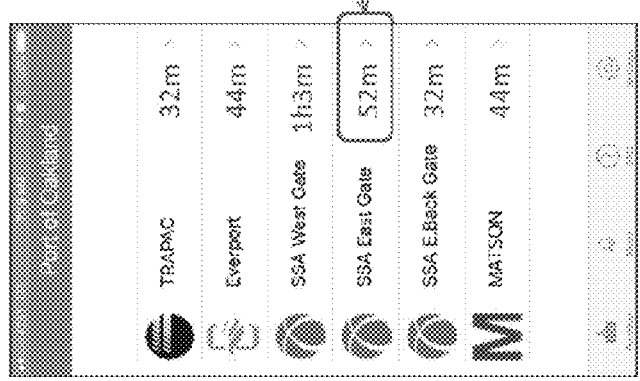
Figure 9A:
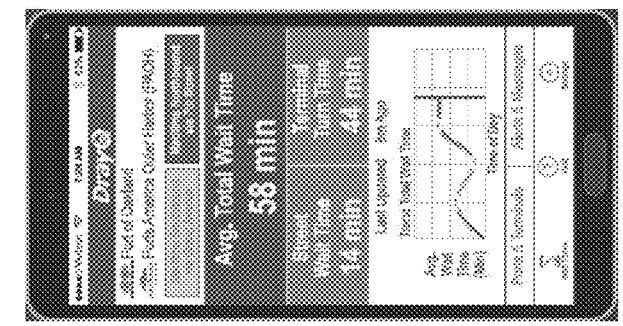

FIGS. 9a-9d illustrate various examples of screen shots which relay terminal wait times and related information via a mobile application to drayage drivers, with specific wait times (Total, Street and Turn) provided for the individual driver registered with the application on a per gate basis when selected (FIG. 9c). Visuals of the route may also be provided as shown in FIG. 9d when cameras are install along the queue route. Similar information can also be relayed via web applications as shown in FIG. 7. The information includes real time current aggregated anonymous wait times on a per terminal basis which are broken down by Street Wait Time and Terminal Wait Time and Total Wait Time=Street Wait Time+Terminal Wait Time. And depending on the driver's level of participation and interaction with the applications, a driver's specific wait time, i.e., running clock, may also be provided as discussed further below. Additional information provided includes alerts and notifications directly to the driver's mobile device.

Specifically, aggregated anonymous wait times are calculated using readily available, anonymous signals, e.g., Bluetooth or Wi-Fi or radio-wave emitting device, emitted from phones or other enabled mobile devices in the drayage truck cabs. Sensors installed through the port and terminal routes, register individual identifier information for each received signal, e.g., the individual MAC (media access control) address, of enabled mobile devices and measure the time between the first and last record of each signal obtained from each registered individual MAC address. Exemplary sensors include solar powered sensor with 4G backhaul. Using this information, it is possible to calculate wait times into and around terminal yards. U.S. Pat. No. 9,426,627, entitled "Queue information and prediction system," which is incorporated herein by reference in its entirety, describes various technologies which may be used to implement data collection. The data gathered by the Bluetooth sensors is processed and analyzed by a back-end computing device programmed accordingly and then is provided through mobile and/or web interfaces accessible by the key players discussed with respect to FIG. 1 including, but not limited to, Port Authorities, Shippers/Shipping Lines, Terminal Operators, Warehouse Operators and, of course, Drayage Companies and Drivers. In addition to real-time wait time information, additional analyses include collection of historical wait times by time, day of week and month so correlations may be made to calculate predicted wait time.

For users, e.g., Drivers wishing to receive wait time data specific to them, e.g., as they are waiting in line, using the mobile or web interface to the DrayQ (or DrayLink) applications, users can provide certain identifying information and receive user-specific details about wait time. Accordingly, the embodiments provide for anonymous aggregated wait time information without registration as well as individual wait time data for registered users. Further benefits associated with registered users is the ability for employers to track individual Drivers' progress during a drayage dispatch. Not only does this information convey details about where specific Drivers are at what time, when coupled with cargo details for a particular drayage run, registered stakeholders from all stages from Port to Terminal to Driver to Drayage company and even to warehouse operators and shippers can track cargo through the delivery process.

The features and functionality of the wait time tracking process may be included in a more feature-rich process and application which provides functionality for implementation of: storage of driver registration profile; storage of driver credentials and license details (e.g., CDL (commercial driver's license), TWIC (Transportation Worker Identification Credential)) and driver and vehicle compliance information (e.g., CARB (California Air Resources Board), STEP (Secure Truck Enrollment Program), CTMP (Comprehensive Truck Management Program)); management of driver qualification file; linkage of Drivers to multiple drayage companies; real-time updates of driver and truck qualifications; tracking, reporting and retaining history record of driver wait times for any container within the system.

As discussed further herein, the TCP supports manageable role-based user functionality, as well as flexible and configurable access-grouping capability. The TCP portal currently provides a robust, flexible capability for registering and managing users of the application and system. By way of example, the sign-up function allows users to register and classify themselves as Port/Board, Tenant/Terminal, Trucking Company, or Driver and establish a respective profile page with basic information, such as name, affiliation/company, address if desired, telephone, email, and other applicable data. In the case of a trucking company, other data may include USDOT number, operating authority fleet truck plate/state information, or RFID tag number. For driver users, other data may include Commercial Driver License (CDL) number or TWIC ID. The TCP is configurable to accommodate any user profile data requirements. And is designed to accommodate any configuration of user association model and can be configured to allow this functionality to be managed by the Port/Board. The application is configurable to allow the Port/Board, Tenant/Terminal, and Trucking Company to easily add, delete, or request/confirm a driver to be associated with a particular viewer group. The TCP group association process is completely configurable to accommodate any guidelines or rules. In the event that the Port/Board would like to consider a mutual association approval process, where requests to associates are sent and confirmations occur between the party users, automated email notifications can be sent to specific users to facilitate the links among the port, terminal, company, and driver. All user profile pages may include phone number, name, affiliation/company, email address, and other similar fields.

The TCP provides the Port/Board with unrestricted access to pull the raw data and information from the system database collected by the application. The TCP portal provides a flexible, configurable role-based access control model to download collected data and information to a PDF file for printing and to download selected data and information to a Microsoft Excel spreadsheet format for all pages and data. All downloads can be saved to the end user's system. The Port/Board can control the roles, the permissions assigned to those roles, and which users are granted which roles. Users will have restricted access to only those data that they have permission to view. The TCP provides Port/Board users the option to print a list of registered Driver users by Trucking Company and Tenant/Terminal; likewise, Trucking Companies and Tenants/Terminals can print lists of their registered Driver users. The Port/Board has the authority to approve and disapprove registration requests and remove users from the system. Downloadable reports can be generated listing the users in the system and their roles. The Port/Board, Tenant/Terminals, and Trucking Companies will have controlled access to change geo-fences and other predefined form data in the system related to their assigned drivers in the system. Functionality is flexible and configurable.

The TCP uses end-to-end encryption to securely store and retrieve all sensitive data. TCP uses digital certificates to sign sites and also implements digital loss prevention and auditing to detect, identify, and block any digital threats to our infrastructure. The back end is hosted on AWS and follows all security best practices outlined by AWS, which includes securing and monitoring digital assets, such as Amazon Machine Images, OS, data, credentials, policy, and configuration. Administrative access to the TCP server is secured via two-factor authentication, requiring an individual (not shared) certificate and password combination.

The TCP portal is implemented as a JavaScript- and Java servlet-based application that is hosted in Tomcat, and it uses a back-end MySQL database. The portal uses Secure Sockets Layer (SSL) for all Internet communications between the user and the portal. Multiple instances are used for development and testing of the applications before production deployment. After application changes are developed and unit tested, our test team performs manual and automated tests on the applications using an internal server to validate that requirements have been met. When the target requirements have been validated through the testing process, the applications are deployed and tested on a production-ready server available on the Internet. All releases are tested in each of these environments before being deployed into production.

Figure 10A:
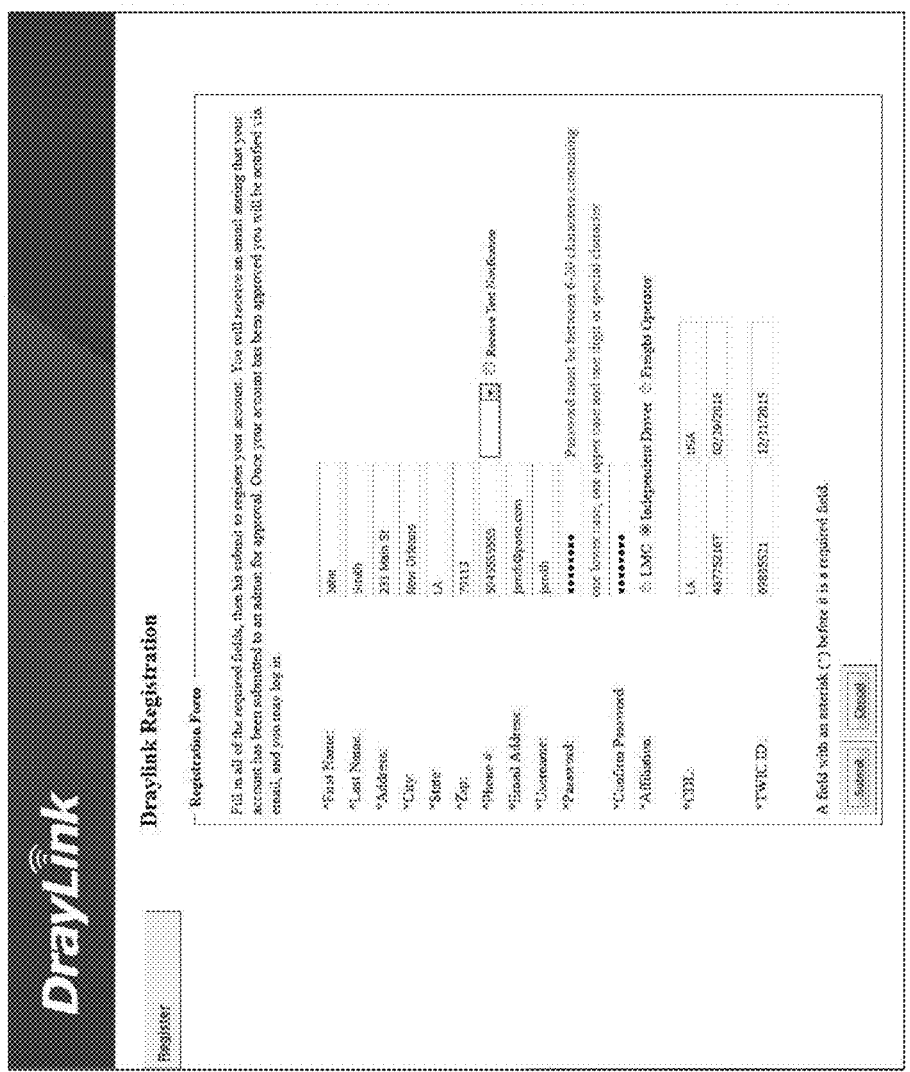
Figure 10B:
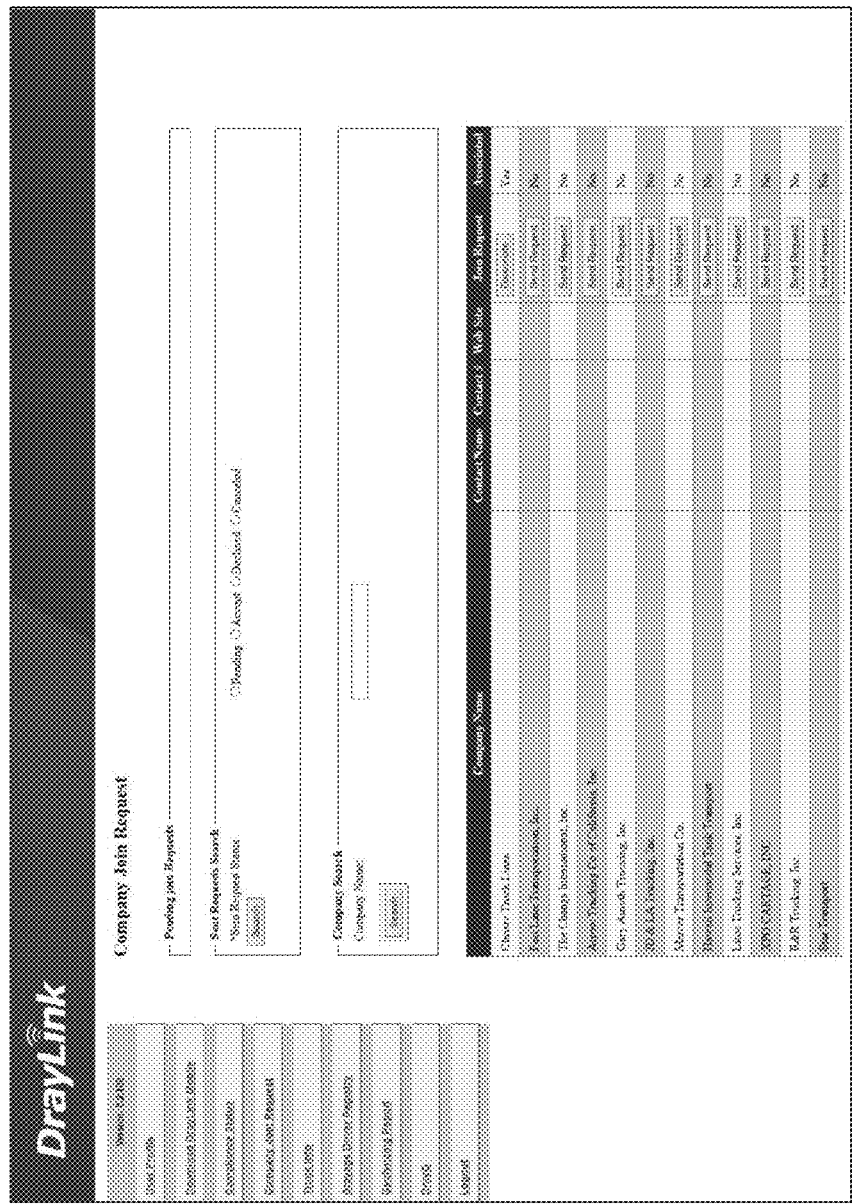
Figure 10C:
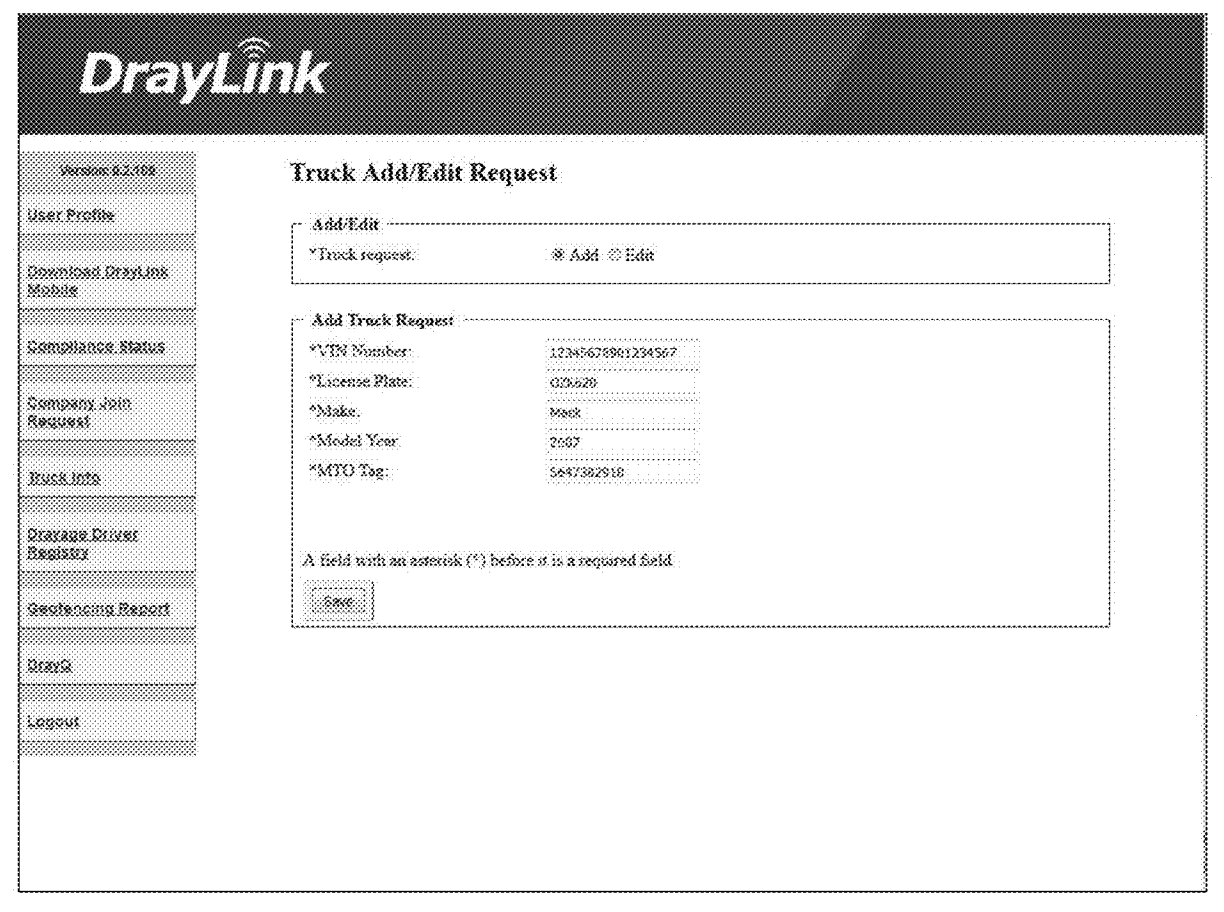

FIGS. 10a-10c illustrate exemplary web portal screens for registering drivers and collecting information to populate databases 12 from FIG. 4. FIG. 10a shows an exemplary Driver Profile Registration Screen. FIG. 10b shows an exemplary Driver Add Company screen where a driver (user) is able to indicate their association with a specific drayage (transportation) company. The company will be sent a request through the contact information, e.g., e-mail or web portal link, provided through the system in or to acknowledge the association with the driver and open up functionality. Similarly, FIG. 10c shows an exemplary Driver Truck Add screen where a driver (user) is able to add a specific vehicle which is associated with the Driver. The web portal is accessible via a browser through an Internet-connected desktop computer or mobile device. GPS data collected and sent by the mobile application are aggregated and stored in the web portal. The GPS data can be viewed in real time on the web portal by users with designated roles. This information is viewable on an integrated map or in a tabular format. The data can be filtered and grouped by configurable geo-fences within the web portal, allowing for actionable events, such as tracking durations and speeds of users through bounded areas. Historical data are viewable in tabular and graphical format displaying wait times and estimated speeds based on time of day. The web portal implements role-based access to manage access rights to various pages, capabilities, and data. The portal administrator can control which portions of the system are accessible to specific user roles.

Figure 11:
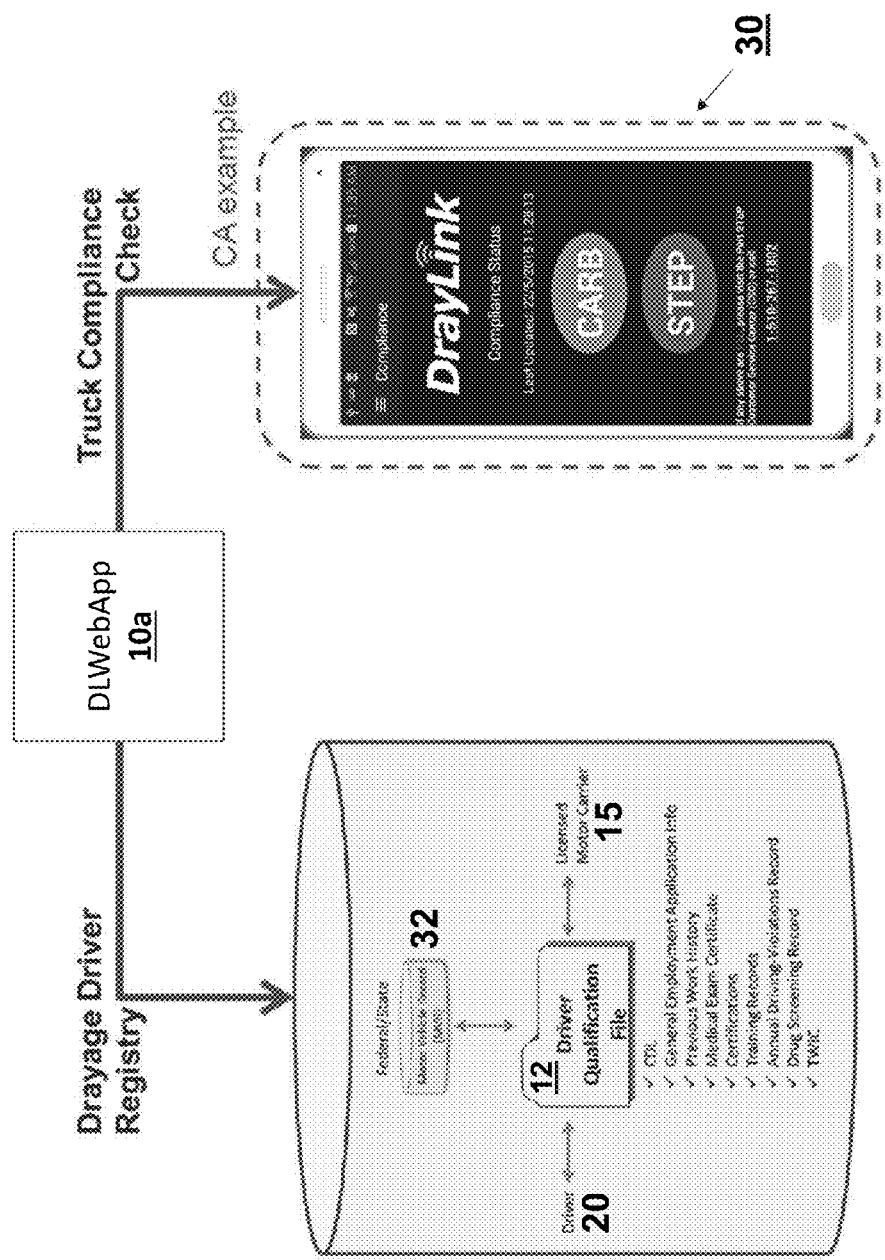
FIG. 11 provides an exemplary schematic of interacting components of the overall system of FIG. 4 for providing specific information about a driver as part of a TCP process.

FIG. 11 illustrates a specific example of a registered driver communicating over the TCP and specifically through the DrayLink Web Application (DLWebApp) 10a of the computing system 100 (FIG. 4). The databases may include individual state and federal public or proprietary databases 32 which contain relevant driver and vehicle records and information, in addition to the "User" information from database 12 (FIG. 4) including individual driver qualification files which include information provided by Drivers and Licensed Motor Carriers. The screenshot shown at 30 is but one of many screenshots which convey certain information about a Driver's compliance status in California, e.g., indicating CARB and STEP compliance. Other jurisdictions may have additional (or fewer) compliance requirements, such as HAZMAT related compliance requirements, etc. and such information may be accessible via one or more public or proprietary databases 32.

Mobile applications include similar screens prompting user input as exemplified by FIGS. 12a-12d. The mobile application can be installed on any Android, iOS, or Windows Mobile device with GPS and mobile data capabilities. The mobile application collects and sends real-time GPS tracking data to the web portal (see FIG. 4). After the first login, the mobile application will automatically run in the background on device start-up, providing GPS data at defined intervals, even if the user is not actively engaging with the application. The application provides a visual indicator on the screen to notify the mobile device user when GPS data is being collected. The user has the option to run the mobile application user interface to alter various application settings, such as frequency of GPS collection.

Users who have registered through the web portal can use the mobile application to update their driver credentials (FIGS. 12b, 12c). By keeping their information updated, they are able to view their truck's compliance status from within the mobile application (FIG. 12d). The statuses are visible intuitively on the home page of the application.

Once the application is installed and the user logs into the application, it starts collecting GPS data and sending it to the web portal. The application launches in the background, so the user does not need to engage with it after logging in for the first time in order for the GPS data to start being collected. The GPS collection will automatically restart if the mobile device is rebooted. The frequency of the GPS data collection can be configured by the user from a settings option. These data can then be used by the web portal to generate actionable events through the graphical user interface (GUI) configurable geo-fences on the portal. Users on the mobile devices will see an indication in the application when they are within a configured geo-fence and data are being sent and stored on the portal. Users are also able to log out of the application to stop the collection of the GPS data.

Figures 13A, 13B, 13C:
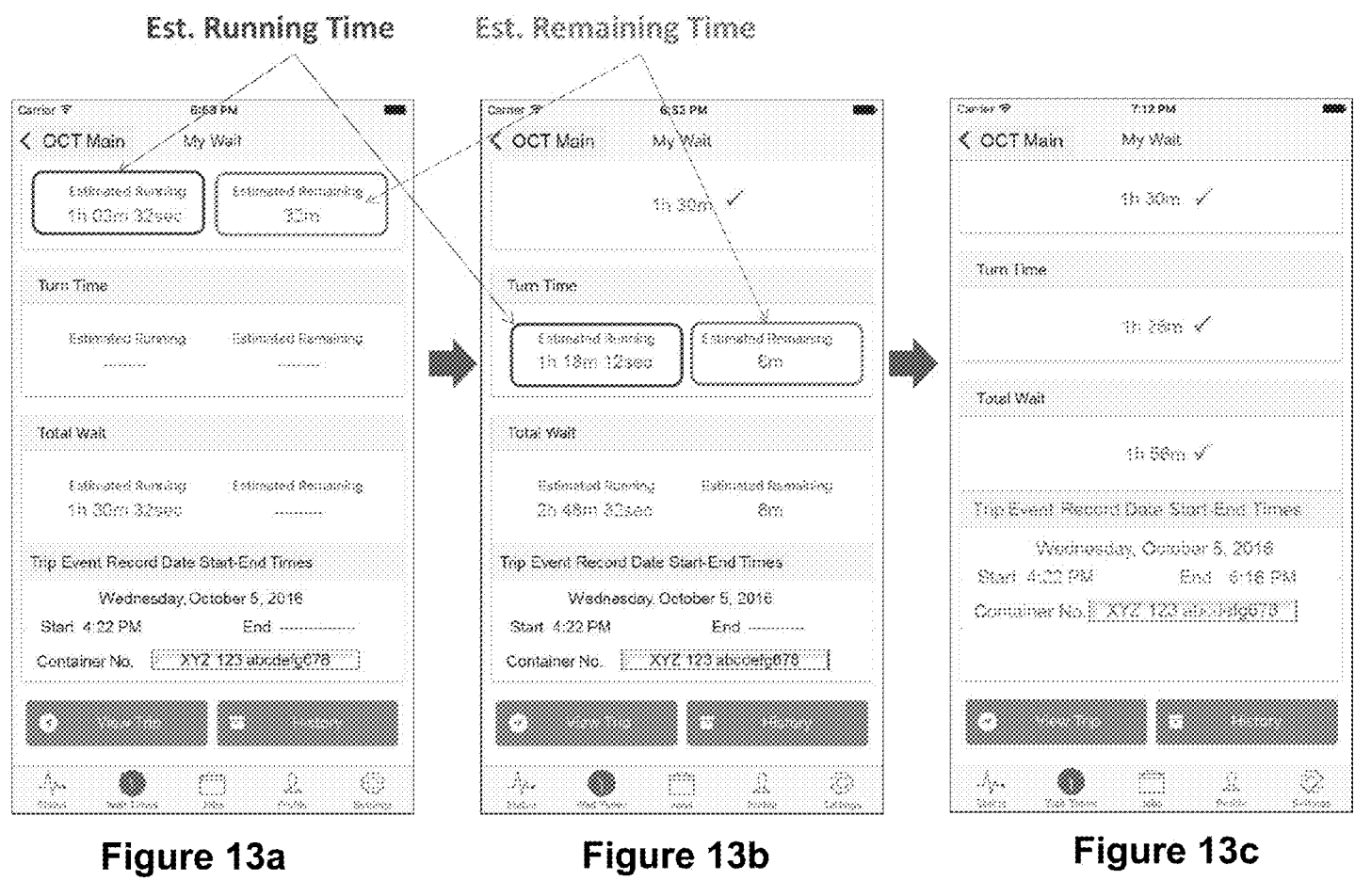

With full registration, additional features allow for specific trip event tracking and record, including calculation of estimated running and estimated remaining times for the street queue (see FIG. 13a), the turn queue (see FIG. 13b) and final totals for the trip (see FIG. 13c). Details such as date, time of day start and finish, as well as container information may also be included to users.

Figures 14A, 14B:
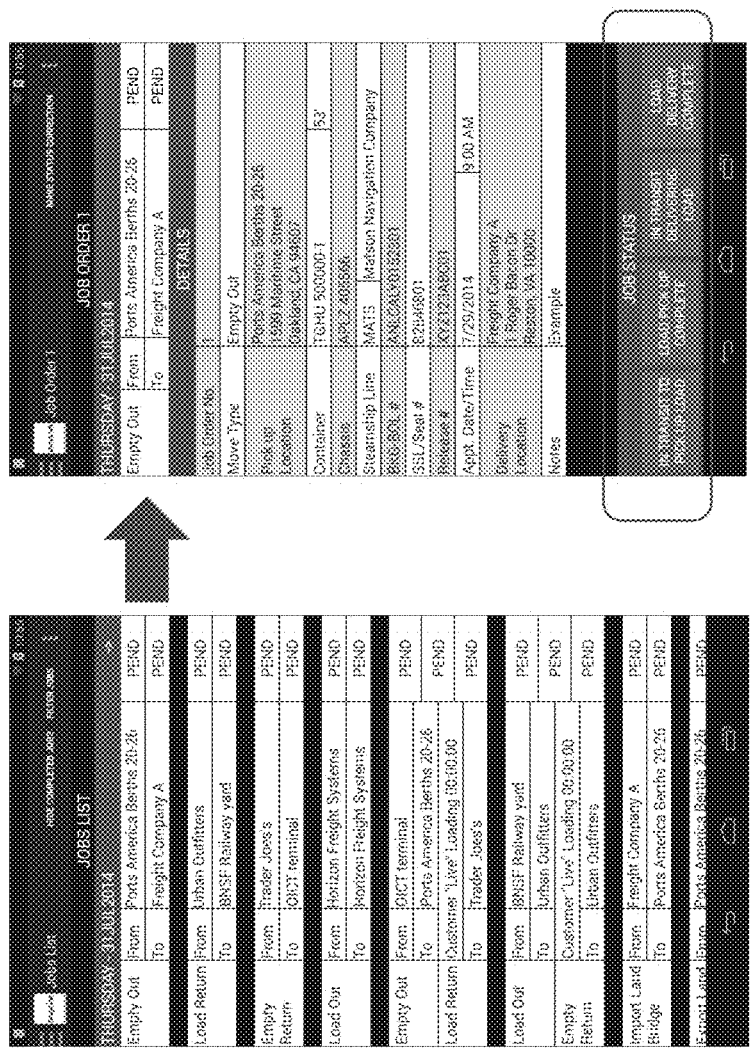
FIGS. 14a-14b illustrate exemplary mobile application screen shots for searching drayage job lists and viewing selected job order status and details using the transport communications platform ("TCP") described herein.

Another feature of the mobile application is the ability for dispatchers and drivers to manage jobs. FIGS. 14a-14b illustrate exemplary mobile applications screen shots (which could also be web-based screen shots) indicating the results of a "jobs list" inquiry through the TCP (FIG. 14a) as well as a more detailed screen (FIG. 14b) showing specific job order (dispatch) details and status upon selection from the list of FIG. 14a. The application allows users to accept jobs from notifications sent to the mobile application from the web portal. Users can also send additional job status updates for the duration of the job and can be tracked by dispatchers on the web portal in real time. For a job completion confirmation, the mobile application also allows finger signature confirmations from user clients.

The device power consumption from the use of the application depends on the type of device, capacity of the battery, and version of mobile operating system (OS) on the device. Default metrics can be calculated on a per-device and OS basis upon request and within given scenarios. Power consumption also depends on the user-configurable setting for frequency of GPS data collection.

While the Mobile queue (DrayQ) functionality discussed herein is particularly advantageous to drayage drivers, the information is also quite useful to drayage companies as they schedule dispatch instructions for drivers. As registered users of the TCP (DrayLink), drayage companies receive and are able to manage real-time and historical wait time information, driver/truck positional information, geofence information, dispatch order status and compliance information.

The web portal displays the location data gathered by the mobile applications in several easy-to-understand ways, based on the user's role. Truckers can view their profile, the aggregate and average wait time information for all geo-fenced areas, and a report detailing a list of the times they have spent in geo-fenced areas. Trucking companies can view the current and historic location for all drivers working for the company, historical location information for all drivers working for the company, the aggregate and average wait time information for all geo-fenced areas, and a report detailing the specific times that drivers spent in geo-fenced areas. Board Tenants can view information on trucks in their terminal and trucks and companies that visit their terminal. The Board members can view all data in the system collected in conjunction with the port. Specific external viewers have access to view current truck locations (but cannot get any information about the truck), and view aggregate and average wait time information for all geo-fenced areas.

In a preferred embodiment, the TCP portal provides a display based on Google Maps (in map and satellite views) that allows authorized users to easily assign and manage the geo-fence areas. The geo-fence areas (see FIG. 15a) can be used to control when GPS and date/time information are tracked and event-based processing when a device enters or leaves a particular defined geo-fenced area. In a preferred embodiment, the TCP uses Amazon S3, which offers a highly durable, scalable, and secure solution for backing up and archiving our critical data. The storage capacity can be increased or decreased on demand and without the risk of running out of storage capacity. Additionally, the embodiments may use Amazon Web Services (AWS) c3.8xlarge instance, which offers a network capacity of 10 Gbps which is sufficient to handle peak traffic loads for drayage applications.

Figure 15A:
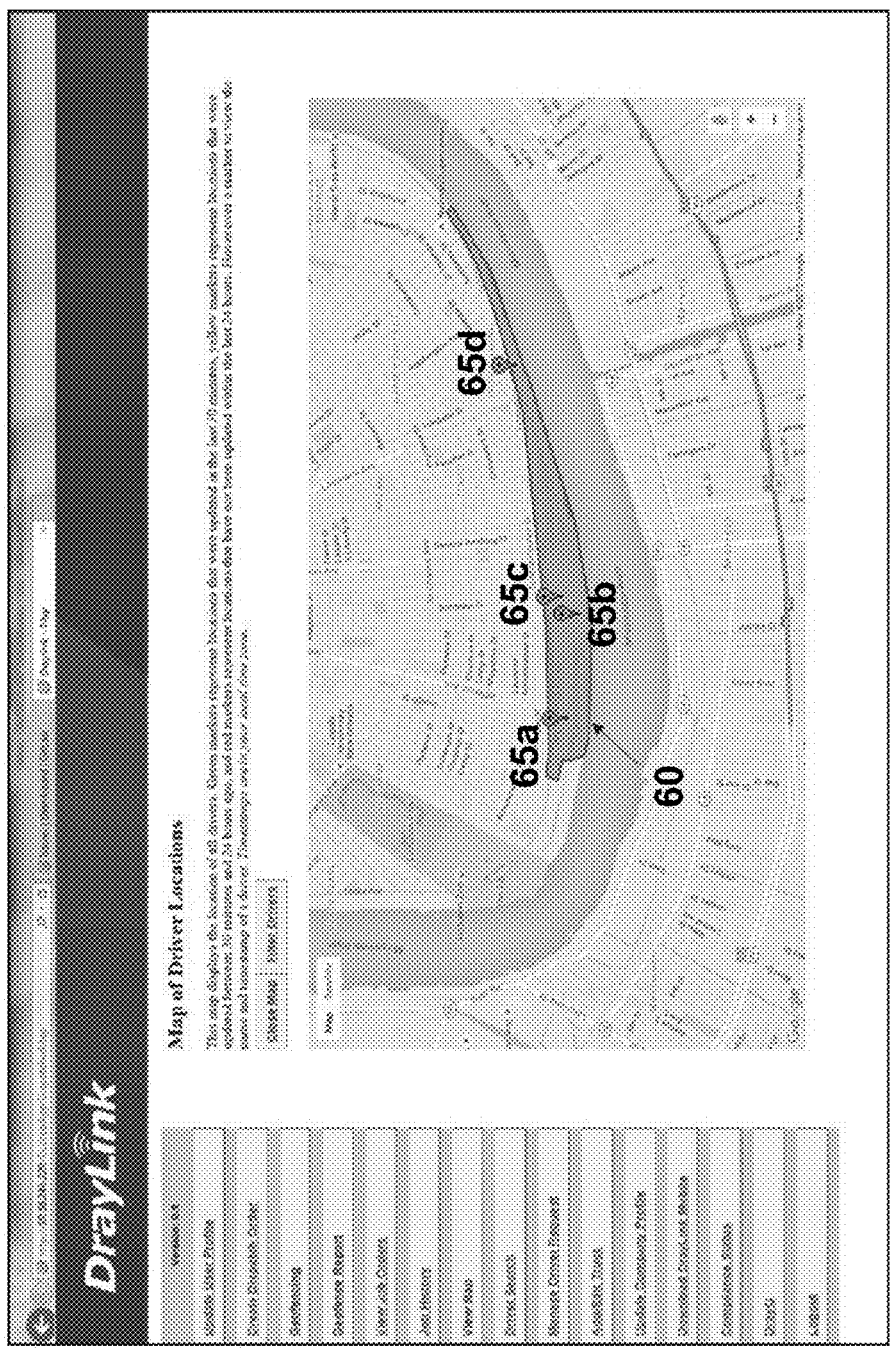
FIGS. 15a-15d illustrate exemplary web portal screen shots implementing geo-fence, tabulation and graphics functionality through the transport communications platform ("TCP") described herein.
Figure 15B:
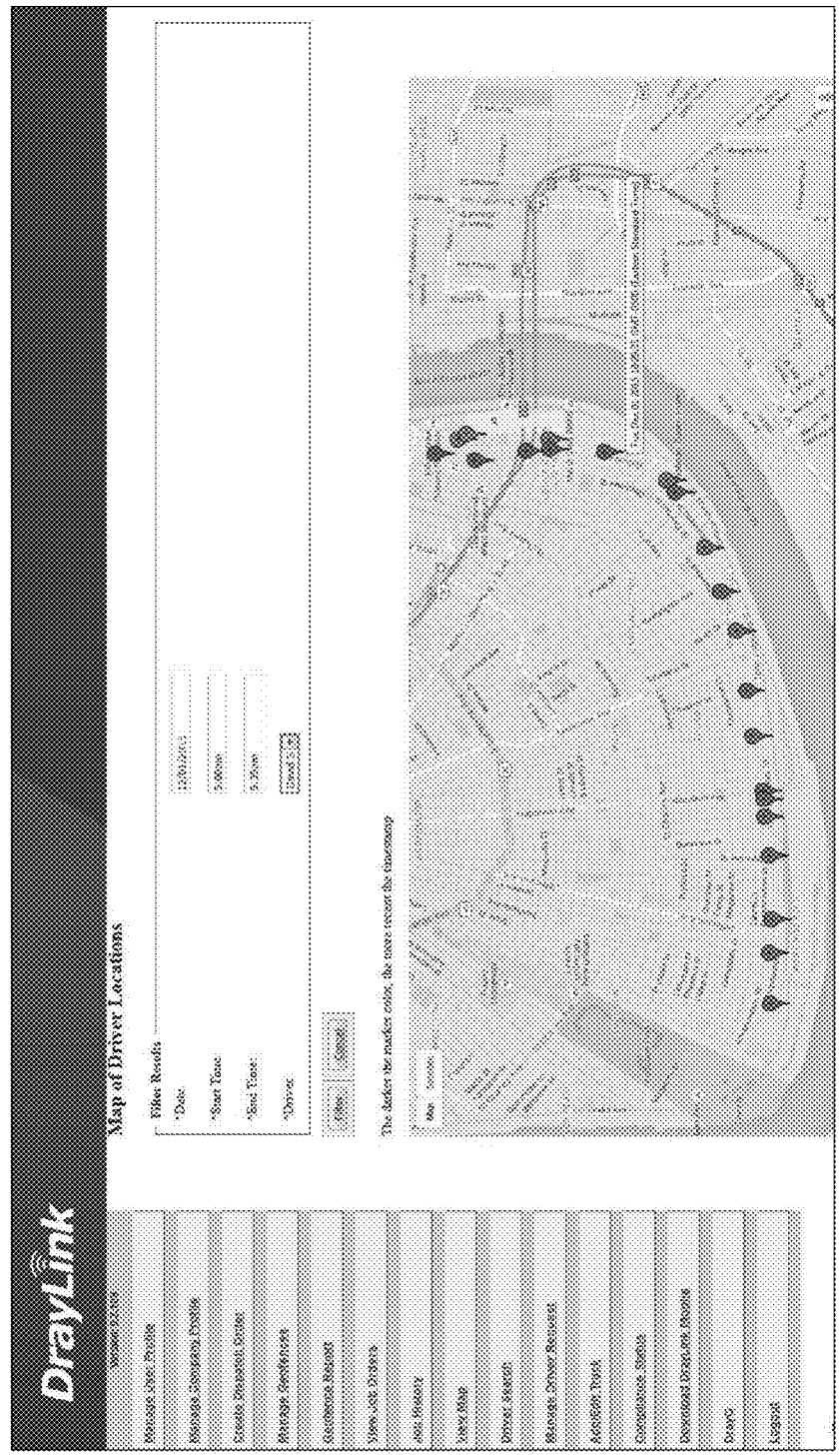
Figure 15C:
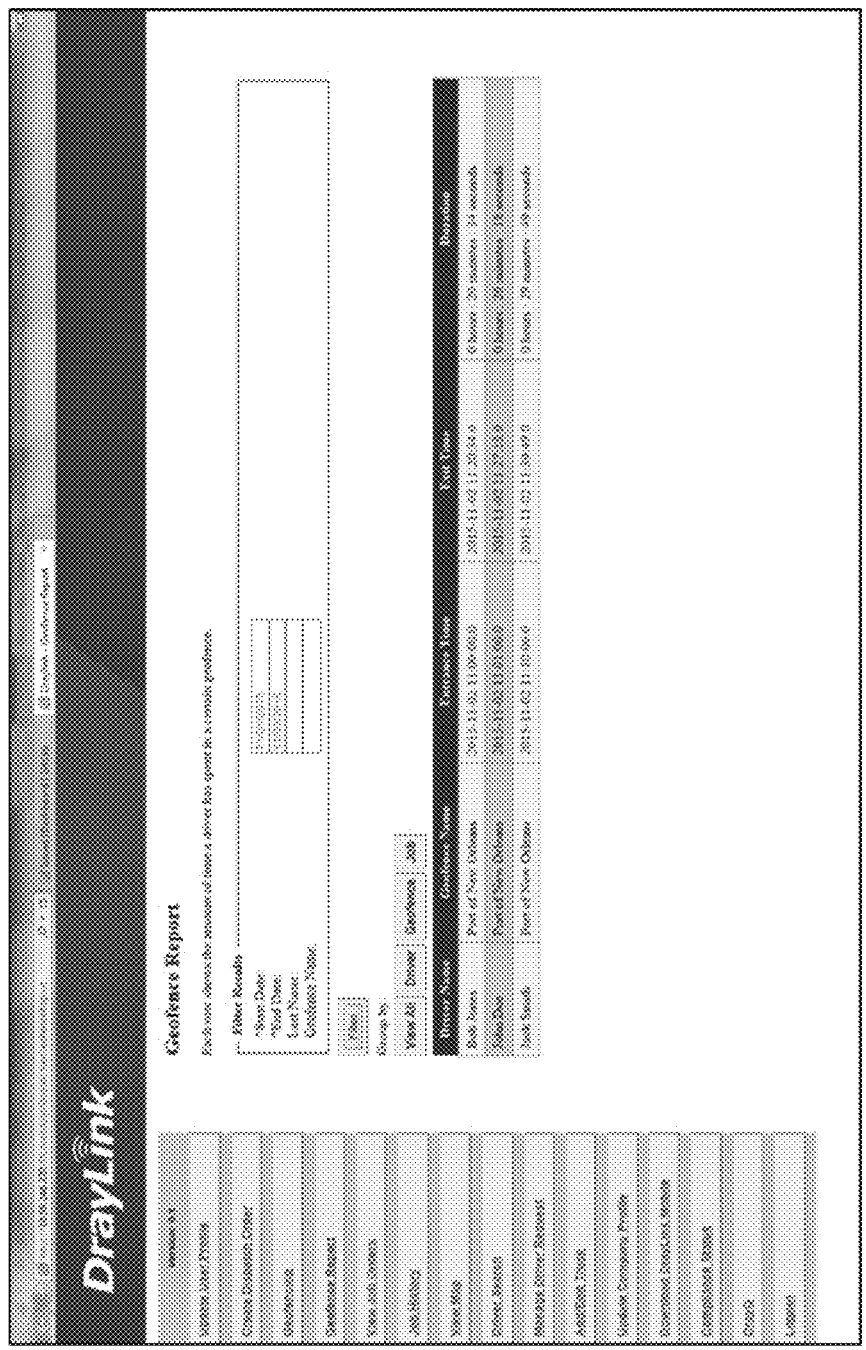
Figure 15D:
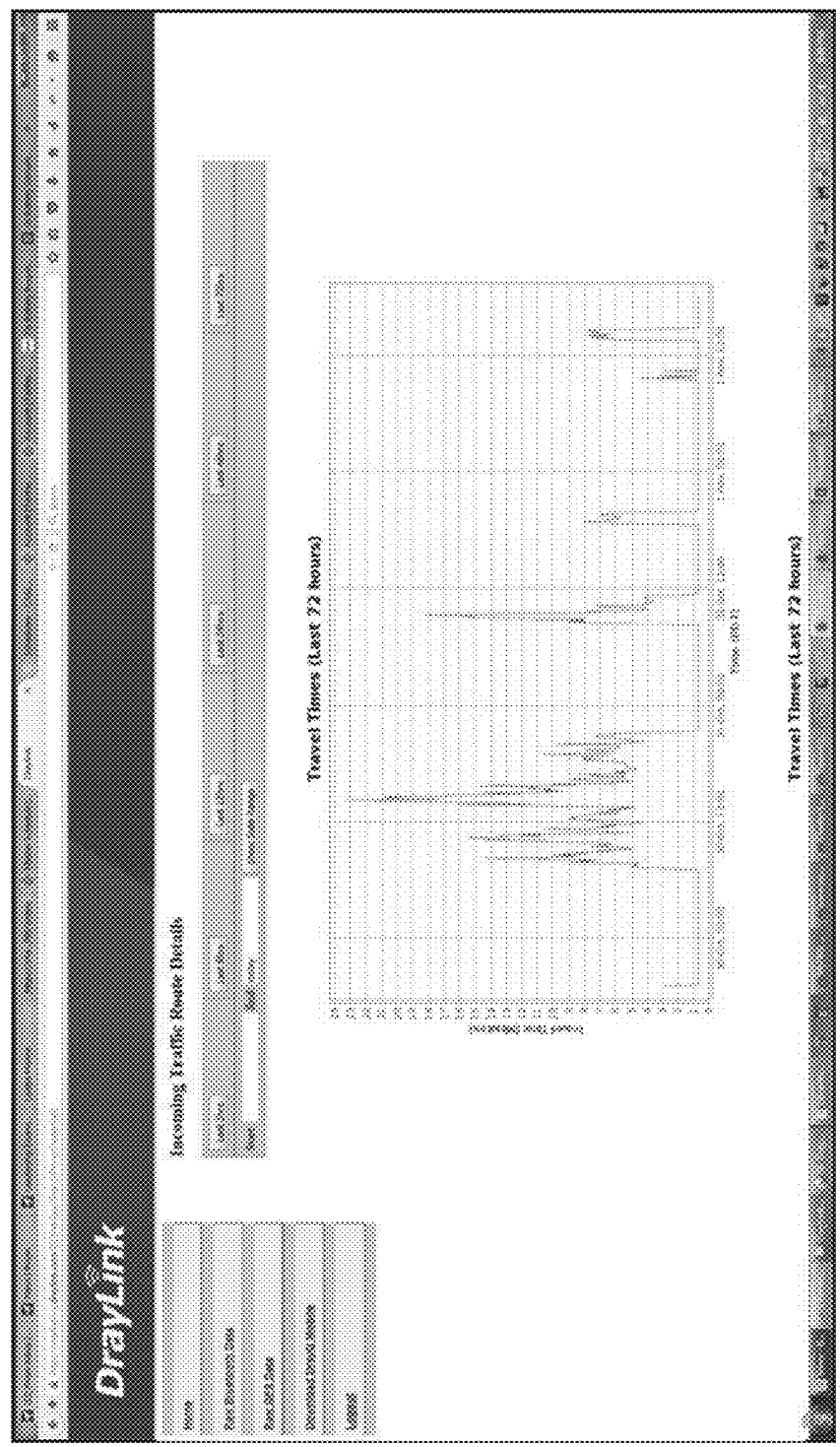

FIGS. 15b-15d illustrate exemplary screenshots for implementation of the mapping/geo-fencing, tabulation and graphics functionality supported by the TCP we portal. FIG. 15a exemplifies the mapping/geo-fencing capability which allows users to define areas within a geo-fence 60 and map driver locations, e.g., 65a-65d, within the geo-fence. The web portal features a map that displays each mobile device user as a pin labeled in green, yellow, or red (or any combination of colors) to designate the age of the user's most recent GPS device communication. For example, green could designate current real-time communication, and the other colors provide older GPS information based on the last time the device was able to communicate with the portal. Alternatively, the color could change in intensity wherein a key defines the spectrum of data age. Hovering over each pin reveals identification information about the mobile device user and current time the use has spent within the present geo-fence (zone). Information can be made visible on a role-to-role basis and can be configured by the portal administrator.

Similar to 15a, FIG. 15b exemplifies a report screen shot which allows the user to map driver locations according to specific date, time interval and driver, wherein timestamp data is available when the user hovers over the individual pins and age of timestamps can be visually indicated using shading spectrum, e.g., the darker the pin on the screen, the more recent the timestamp.

FIG. 15c exemplifies a tabulation filtering screen shot accessible through the web portal. All tabular supporting data and graphical images can be downloaded from the web portal, depending on the role configured for the user by the portal administrator. Tabular data can be downloaded in the form of a comma-separated values (CSV) file, which can be viewed in software such as Microsoft Excel; graphs can be downloaded into a PDF format. Users can select which data they want to download by using the filtering feature and then exporting that data to disk from in the web portal.

FIG. 15d exemplifies a graphics screen shot accessible through the web portal. The screen shot will display historical trends to show driver mobility in the form of graphs or heat maps. Users can narrow to specific date ranges that can be selected via the portal. In addition, the TCP offers historical trends in wait time estimates for various times and days of the week. Based on these graphs, users can gauge the traditionally busy times and days for the port.

Figure 16A:
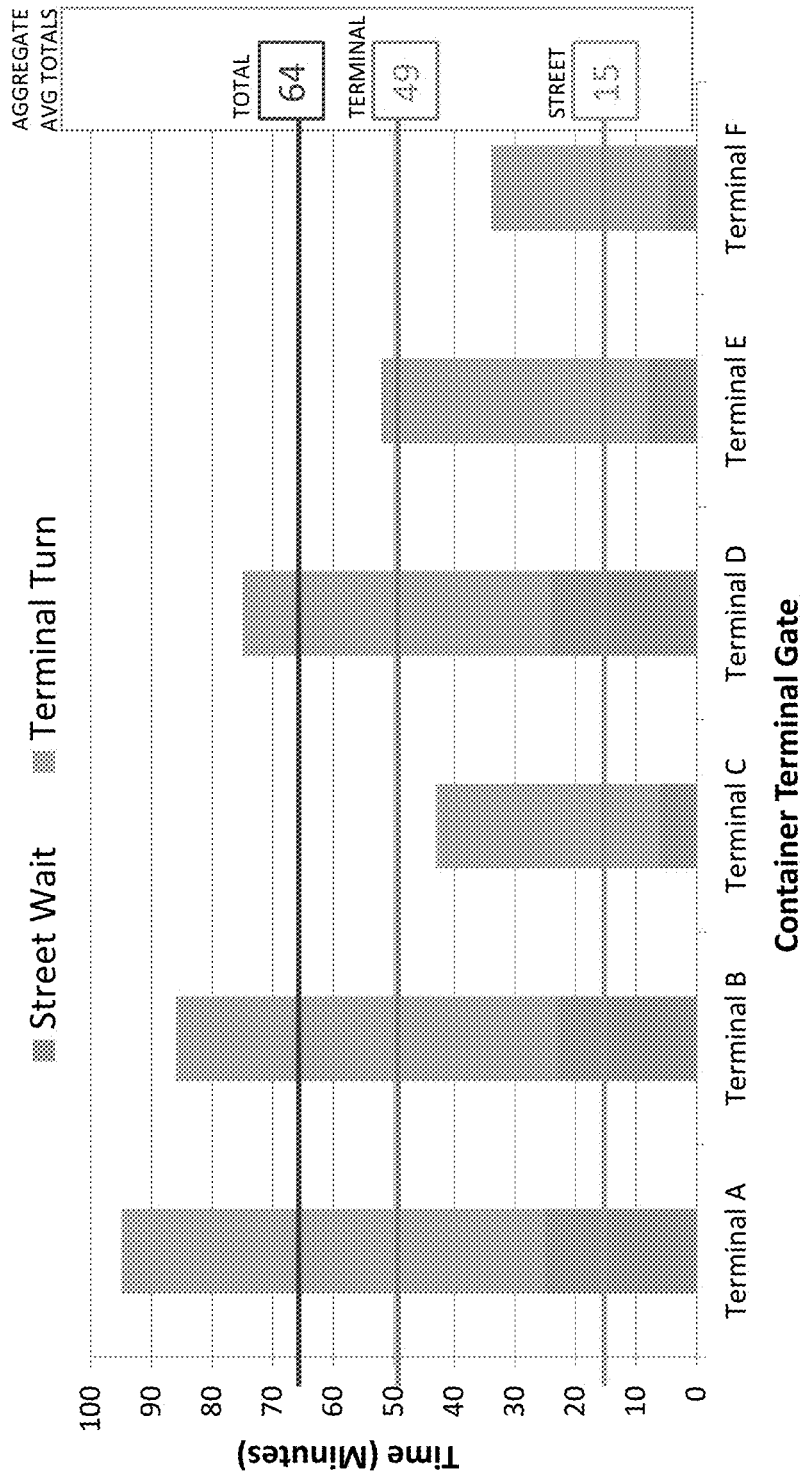
FIG. 16a-16d illustrate exemplary useful reports showing wait times at terminals over selected periods of time through the transport communications platform ("TCP") described herein.
Figure 16B:
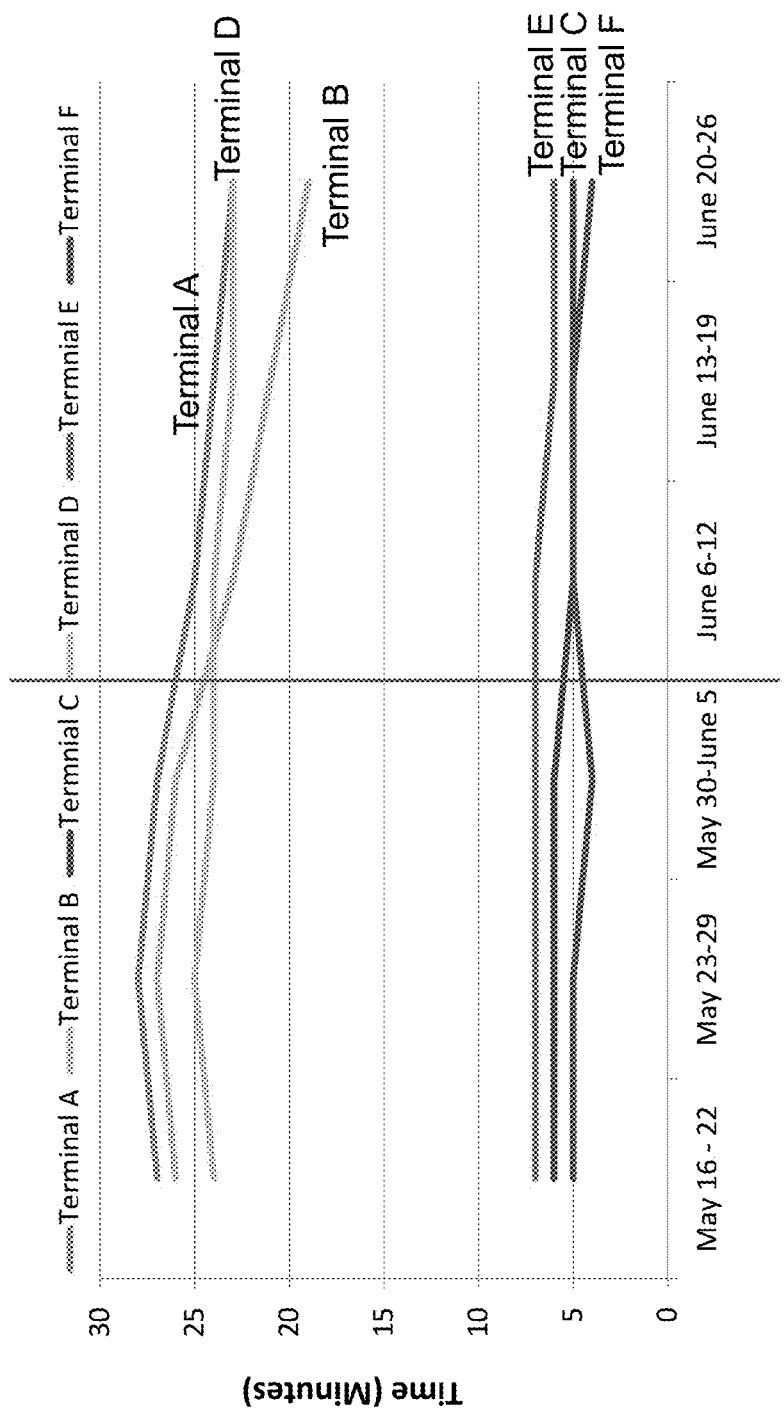
Figure 16C:
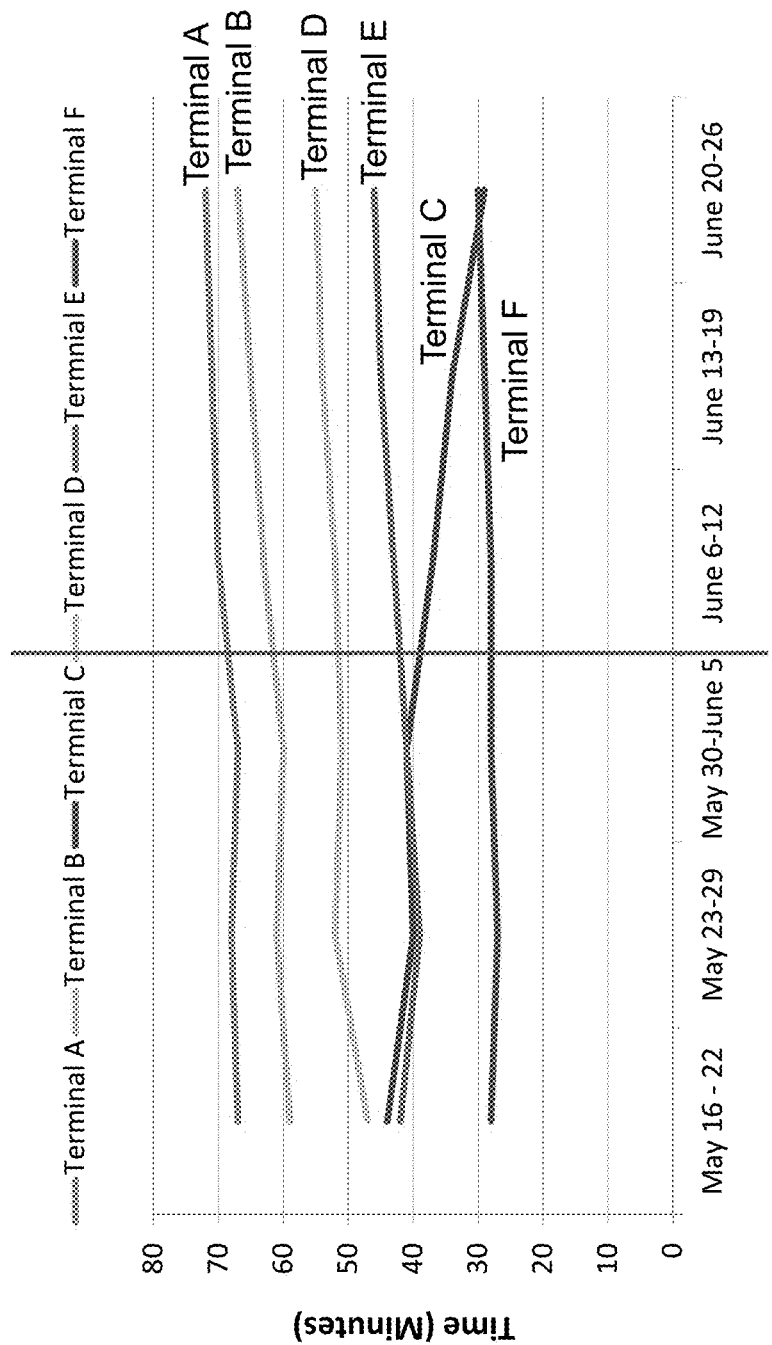
Figure 16D:
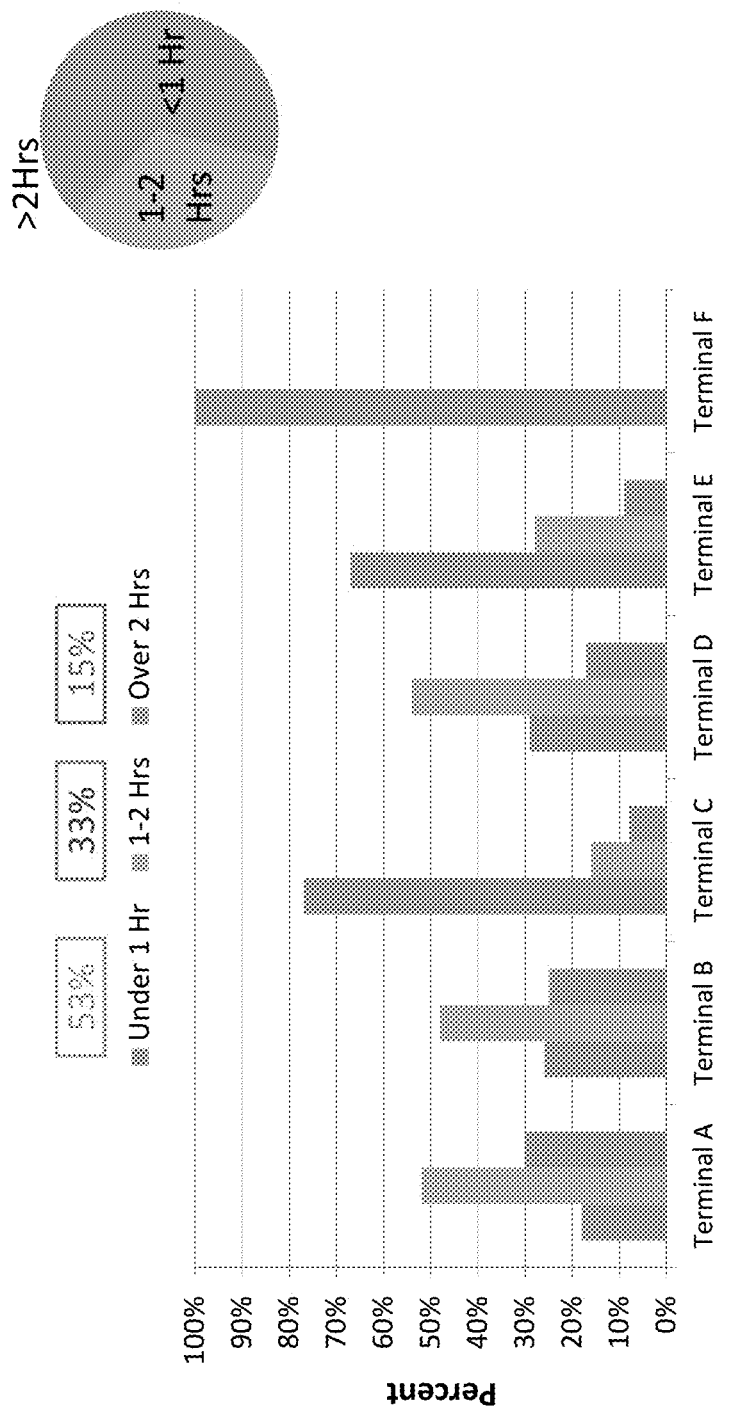

The TCP also provides your generating of numerous other useful reports showing wait times at terminals over selected periods of time. For example, FIG. 16a illustrates a user selected report showing aggregate average totals per terminal over a selected period of time. Similarly, FIGS. 16b and 16c illustrate average aggregate wait time by street wait time (FIG. 16b) and by terminal wait time (FIG. 16c) on a per terminal basis over a set time period. And in yet another useful visual, FIG. 16d provides for total wait time distribution over the set time period.

Figure 17A:
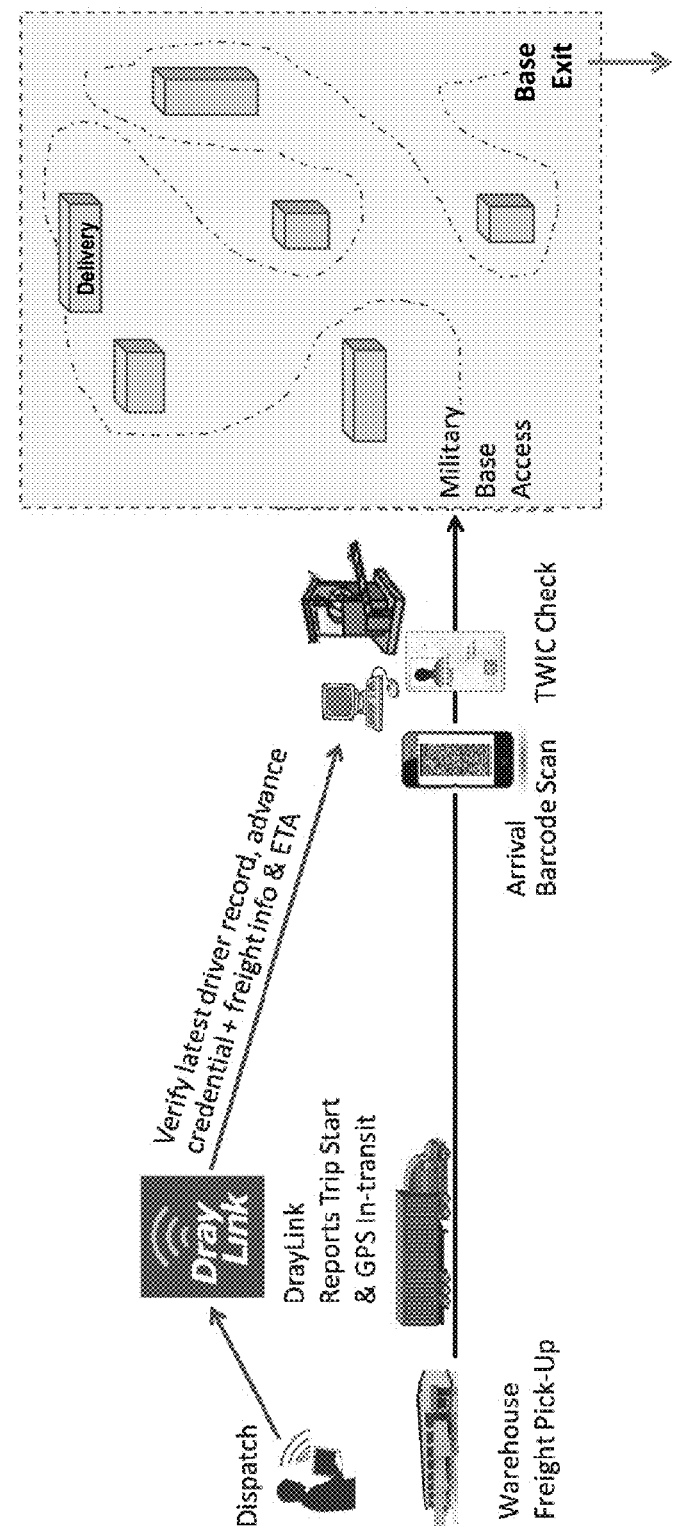
FIGS. 17a-17c provide for specific exemplary scenarios wherein the TCP functionality and features may be implemented as described with respect to one or more embodiments.
Figure 17B:
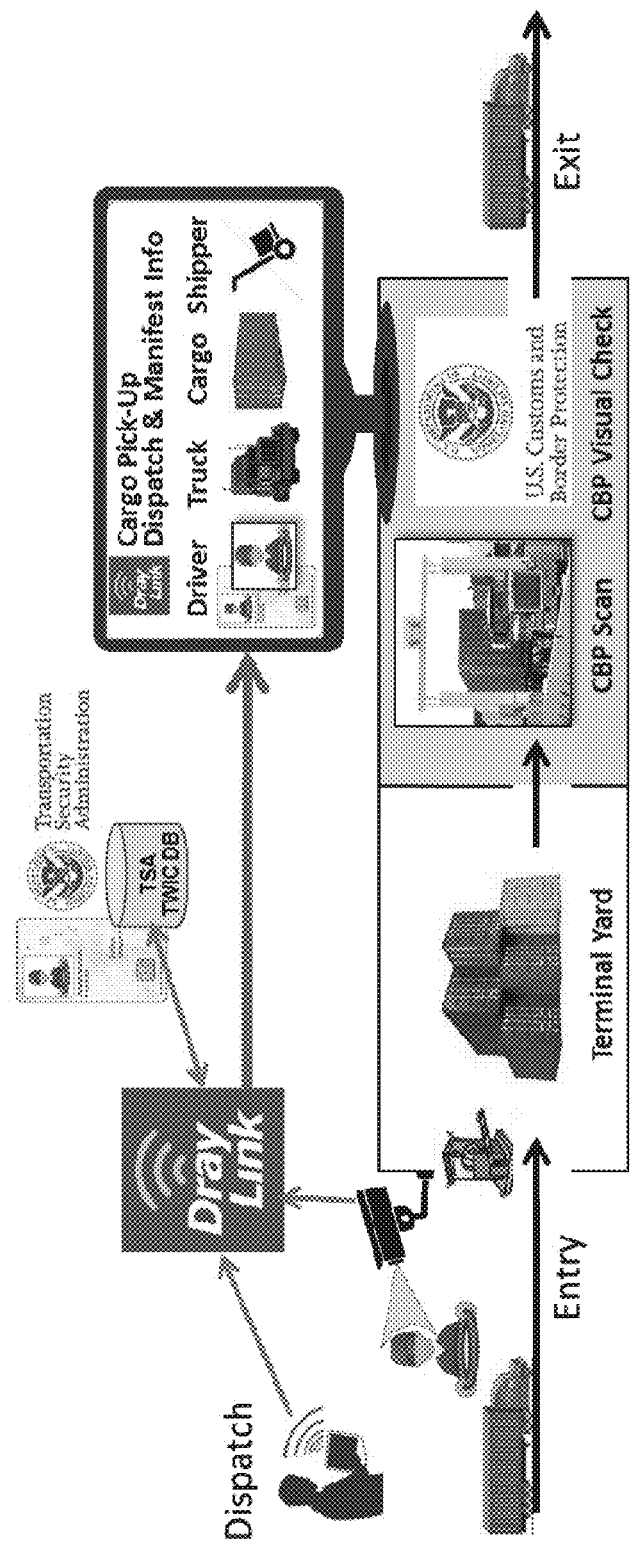
Figure 17C:
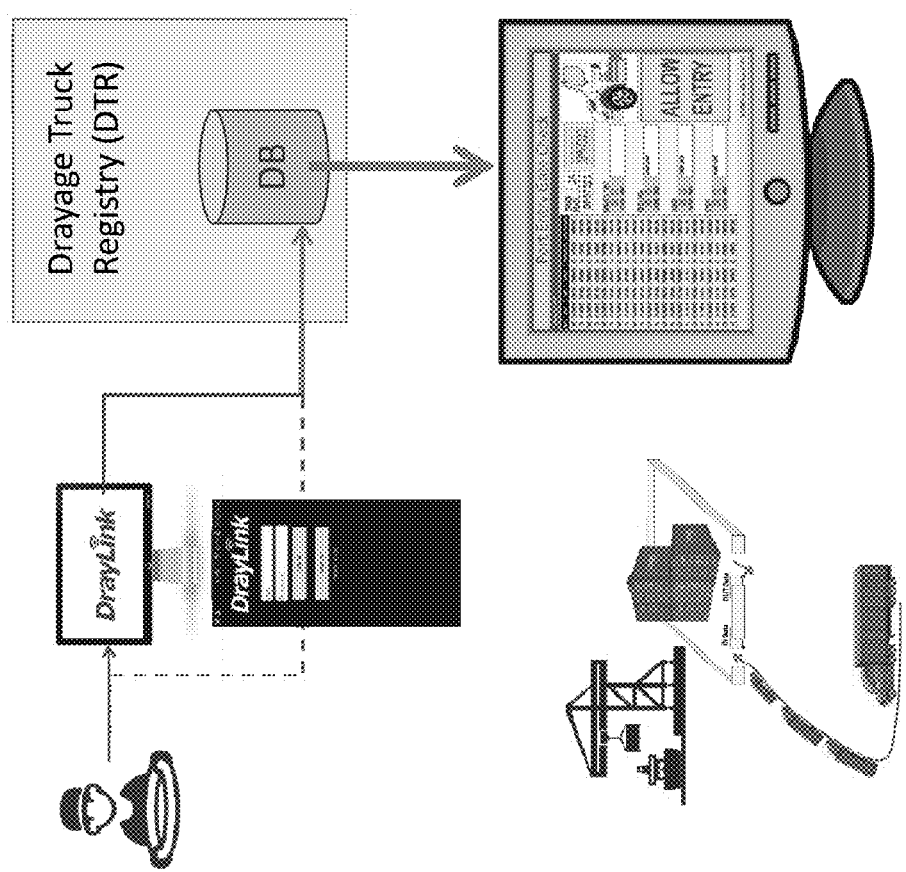

FIGS. 17a-17c illustrate additional scenarios wherein the TCP functionality and features are implemented. In FIG. 17a, the TCP (DrayLink) provides information to a military base in advance of driver arrival at the base providing driver, truck and manifest details to the base, as well as estimate time of arrival (ETA). Details include driver record, advance credential information for verification, as well as freight information. Upon arrival at the base, at the access control gate, driver may be verified using a barcode on the driver's mobile device and/or chip verification using an issued credential such as a TWIC badge. Further, while on the base, the TCP can track driver's movement through the base, including delivery location.

In FIG. 17b, the TCP (DrayLink) receives/accesses different identifying information from different sources to speed up the cargo pick-up and release process at a terminal. The TCP receives the driver, truck, manifest, EOT information from the dispatcher, accesses or receives face recognition data for the driver at the entrance to the terminal yard and requests verification of credentials from issuing databases (TWIC) such as the Transportation Security Administration. This information is cross-checked and confirmed and cargo pick-up dispatch and manifest information is provided to the Customer & Border Patrol (CBP) to facilitate CBP visual inspection and release of cargo from the terminal.

And in FIG. 17c, the TCP (DrayLink) supports the population of a drayage truck registry (DTR) at individual ports. This information may be provided by drivers who self-register with the TCP (e.g., FIGS. 10-12d). This shared information allows for pre-screening and faster gate entry at the terminal.

As part of the technology implementation, cybersecurity measures are taken to protect the data, including network security, access control, and audit and accountability. As a further extension of the technology, Bluetooth sensors may also be used make turn-time measurements within individual terminals and even within specific lanes. Turn-times refer to the amount of time it takes a driver to conduct transactions once inside terminal gates. Gate waiting and turn times are critical metrics for truckers and cargo owners eager to avoid delays at ports. And the information can also signal to terminal operators when to open or close individual lanes in accordance with traffic volume.

Accordingly, the present embodiments provide at least the following benefits to both direct and secondary users of the process described herein. For the Ports, benefits include: increase demand for port services and throughput of container moves; optimize space utilization and increase lease value-revenue; and increase safety and security of operations. For the Shipping Line, benefits include: Grow more customers—business—increase container utilization (ships); Track all my globally distributed shipping containers; Increase useful life of containers. For the Terminal Operators, benefits include: get more customers—business—process more containers; Plan labor to deal with unpredictable truck arrival demand; Optimize coordination of in-yard truck location management, loading. For the Shipper, benefits include: Know where container (cargo) is at all times, from terminal, to transit, to warehouse (destination) and Know when driver picking up and dropping off, estimate time of arrival (ETA), and geo-fence updates. For the Drayage company, benefits include: Satisfy shippers, get more customers and move more containers; optimize driver utilization, manage assignments, better access to drivers; Improve dispatch, do less paperwork, reduce empty loads. For the Driver, benefits include: Do more dispatch moves, make more money, reduce empty loads; make themselves available to companies with demand; and reduce congestion and total wait time to get processed through terminals.

The invention claimed is:

1. A system for determining a wait time along a predetermined vehicle route comprising:
   multiple sensors for receiving individual wireless signals from one or more emitting devices located in a vehicle within a predetermined threshold range of each of the multiple sensors, wherein each of the multiple sensors is located along the predetermined vehicle route;
   a wireless data aggregator module running on at least one processor for collecting the individual wireless signals from the multiple sensors, wherein for each individual wireless signal the wireless data aggregator module identifies at least an individual transmission device emitting the individual wireless signal and the multiple sensor that received the individual wireless signal; and
   a wait time determination module running on at least one processor for analyzing data from the wireless data aggregator module to calculate a length of time that each of the individual wireless signals takes to move along the predetermined vehicle route and generating an output indicative of the length of time for at least one of the individual wireless signals.

2. The system of claim 1, wherein one or more of the individual wireless signals are emitted from a mobile device located within the vehicle or a device integrated with the vehicle.

3. The system of claim 2, wherein the individual wireless signals are selected from the group consisting of WiFi, and radio frequency.

4. The system of claim 1, wherein the output indicative of length of time represents data for multiple individual wireless signals and includes an average wait time for a first predetermined portion of the route, an average wait time for a second predetermined portion of the route and a total average wait time for the first predetermined portion and second predetermined portion route in combination.

5. The system of claim 1, wherein at least a portion of the received individual wireless signals are from registered emitting devices, wherein an identity of one of the vehicle and the driver are known to the data aggregator module in accordance with the registered emitting device, the registered emitting devices being registered through the wait time determination module.

6. The system of claim 5, wherein for each of the registered emitting devices, the output indicative of the length of time includes estimated wait time for the registered emitting device, wherein the estimated wait time is calculated in real time using current wireless signal data available from the registered emitting device.

7. The system of claim 6, wherein for each of the registered emitting devices, the output indicative of the length of time includes an estimated running time for the registered emitting device along the predetermined vehicle route and an estimated remaining time to travel for the registered device along the predetermined vehicle route.

8. The system of claim 5, further comprising:
at least one server for communicating with one or more external sources of data related to a user associated with each of the registered emitting devices; and
at least one database for storing data indicative of the registered emitting devices, each of the individual wireless signals from the multiple sensors, and predetermined drayage order data assigned to each of the registered emitting devices;
wherein the wait time determination module analyzes stored data and determines updated drayage order status for registered emitting devices in accordance with estimated wait time for each of the registered emitting devices.

9. The system of claim 8, wherein the one or more external sources of data includes driver credential information for drivers associated with the registered emitting devices.

10. A process for determining a wait time along a predetermined vehicle route comprising:
receiving individual wireless signals from one or more emitting devices in a vehicle at multiple sensors located within a predetermined threshold range of each of the multiple sensors, wherein each of the multiple sensors is located along the predetermined vehicle route;
collecting the individual wireless signals from the multiple sensors at a wireless data aggregator module running on at least one processor, wherein for each individual wireless signal the wireless data aggregator module identifies at least an individual transmission device emitting the individual wireless signal and the multiple sensor that received the individual wireless signal; and
analyzing data from the wireless data aggregator module by a wait time determination module running on at least one processor to calculate a length of time that each of the individual wireless signals takes to move along the predetermined vehicle route and generating an output indicative of the length of time for at least one of the individual wireless signals.

11. The process of claim 10, wherein the output indicative of length of time represents data for multiple individual wireless signals and includes an average wait time for a first predetermined portion of the route, an average wait time for a second predetermined portion of the route and a total average wait time for the first predetermined portion and second predetermined portion route in combination.

12. The process of claim 10, wherein at least a portion of the received individual wireless signals are from registered emitting devices, wherein an identity of one of the vehicle and the driver are known to the data aggregator module in accordance with the registered emitting device, the registered emitting devices being registered through the wait time determination module.

13. The system of claim 12, wherein for each of the registered emitting devices, the output indicative of the length of time includes estimated wait time for the registered emitting device, wherein the estimated wait time is calculated in real time using current wireless signal data available from the registered emitting device.

14. The system of claim 13, wherein for each of the registered emitting devices, the output indicative of the length of time includes an estimated running time for the registered emitting device along the predetermined vehicle route and an estimated remaining time to travel for the registered device along the predetermined vehicle route.

15. The process of claim 12, further comprising:
communicating over at least one server with one or more external sources of data related to a user associated with each of the registered emitting devices; and
storing in at least one database data indicative of the registered emitting devices, each of the individual wireless signals from the multiple sensors, and predetermined drayage order data assigned to each of the registered emitting devices;
analyzing by the wait time determination module the stored data and determining updated drayage order status for registered emitting devices in accordance with estimated wait time for each of the registered emitting devices.

\* \* \* \* \*